US010685780B2

(12) United States Patent
Miyamoto

(10) Patent No.: US 10,685,780 B2
(45) Date of Patent: Jun. 16, 2020

(54) ELECTRIC POWER FEED APPARATUS, ELECTRIC POWER FEED SYSTEM, AND ELECTRONIC APPARATUS

(75) Inventor: Takashi Miyamoto, Chiba (JP)

(73) Assignee: Sony Corporation, Tokyo (JP)

(*) Notice: Subject to any disclaimer, the term of this patent is extended or adjusted under 35 U.S.C. 154(b) by 1312 days.

(21) Appl. No.: 14/005,776

(22) PCT Filed: Mar. 9, 2012

(86) PCT No.: PCT/JP2012/056138
§ 371 (c)(1),
(2), (4) Date: Sep. 17, 2013

(87) PCT Pub. No.: WO2012/132841
PCT Pub. Date: Oct. 4, 2012

(65) Prior Publication Data
US 2014/0008974 A1 Jan. 9, 2014

(30) Foreign Application Priority Data
Mar. 29, 2011 (JP) ................. 2011-073074

(51) Int. Cl.
H01F 38/14 (2006.01)
H02J 50/12 (2016.01)
H02J 50/40 (2016.01)
H02J 50/60 (2016.01)
H02J 50/70 (2016.01)
H02J 50/90 (2016.01)
H01F 27/28 (2006.01)

(52) U.S. Cl.
CPC ......... H01F 38/14 (2013.01); H01F 27/2871 (2013.01); H02J 50/12 (2016.02);
(Continued)

(58) Field of Classification Search
CPC ...... H01F 27/2871; H01F 38/14; H02J 5/005; H02J 50/12; H02J 50/40; H02J 50/60;
(Continued)

(56) References Cited
U.S. PATENT DOCUMENTS

2008/0266748 A1* 10/2008 Lee .................. H02J 5/005
361/270
2009/0085408 A1* 4/2009 Bruhn .................. H01F 38/14
307/104
(Continued)

FOREIGN PATENT DOCUMENTS

JP 2005-006440 1/2005
JP 2010-239777 10/2010
(Continued)

OTHER PUBLICATIONS

Supplemental European Search Report issued in connection with related EP application No. EP 1276 5766 dated Aug. 29, 2014.

Primary Examiner — Pinping Sun
Assistant Examiner — Toan T Vu
(74) Attorney, Agent, or Firm — Chip Law Group

(57) ABSTRACT

There are provided an electric power feed apparatus, an electric power feed system, and an electronic apparatus which are capable of performing transmission efficiency control corresponding to positions of apparatuses when electric power transmission is performed between the apparatuses through a magnetic field. The electric power feed apparatus includes an electric power transmission section including an electric power transmission coil for performing electric power transmission through a magnetic field and an auxiliary resonance section including one or a plurality of resonators. A main resonant frequency in a main resonance operation with use of the electric power transmission coil during the electric power transmission and an auxiliary resonant frequency in the resonator are different from each (Continued)

other. A relationship (corresponding characteristics) between a relative position between the electric power feed apparatus (an electric power transmission side) and the electronic apparatus (an electric power reception side) and transmission efficiency during electric power transmission is varied by adjustment of such a difference between the resonant frequencies.

15 Claims, 18 Drawing Sheets

(52) U.S. Cl.
CPC .............. *H02J 50/40* (2016.02); *H02J 50/60* (2016.02); *H02J 50/70* (2016.02); *H02J 50/90* (2016.02); *Y10T 307/25* (2015.04)

(58) Field of Classification Search
CPC . H02J 50/70; H02J 50/90; H02J 7/025; Y10T 307/25
USPC ........................................................ 307/104
See application file for complete search history.

(56) References Cited

U.S. PATENT DOCUMENTS

| | | | | |
|---|---|---|---|---|
| 2009/0102419 A1* | 4/2009 | Gwon | ................. | H01F 27/2871 320/108 |
| 2009/0230777 A1* | 9/2009 | Baarman | ................. | H01F 38/14 307/104 |
| 2011/0115433 A1* | 5/2011 | Lee | ......................... | H02J 7/025 320/108 |
| 2011/0127846 A1* | 6/2011 | Urano | ..................... | H02J 50/12 307/104 |
| 2011/0133569 A1* | 6/2011 | Cheon | ..................... | H02J 17/00 307/104 |
| 2011/0156640 A1* | 6/2011 | Moshfeghi | .............. | H02J 7/025 320/108 |

FOREIGN PATENT DOCUMENTS

| | | |
|---|---|---|
| JP | 2010-252497 | 11/2010 |
| JP | 2011-030344 | 2/2011 |
| WO | WO/2011/034264 A1 | 3/2011 |

* cited by examiner

[FIG. 1]
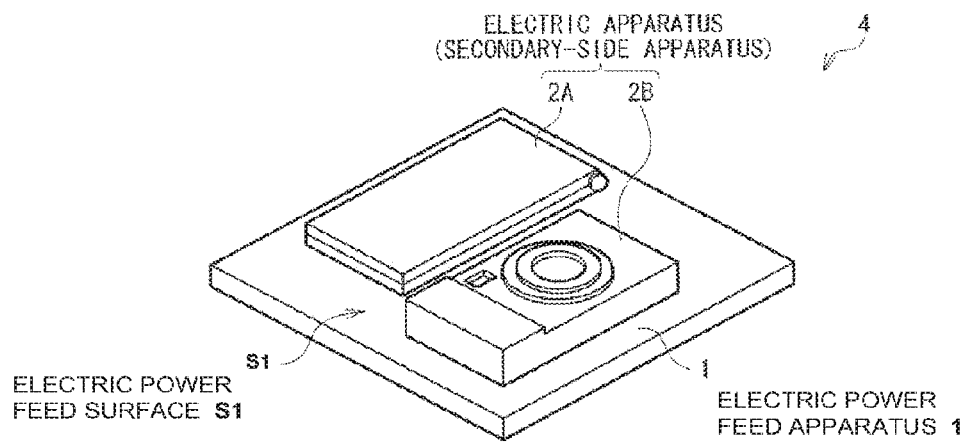
[FIG. 2]
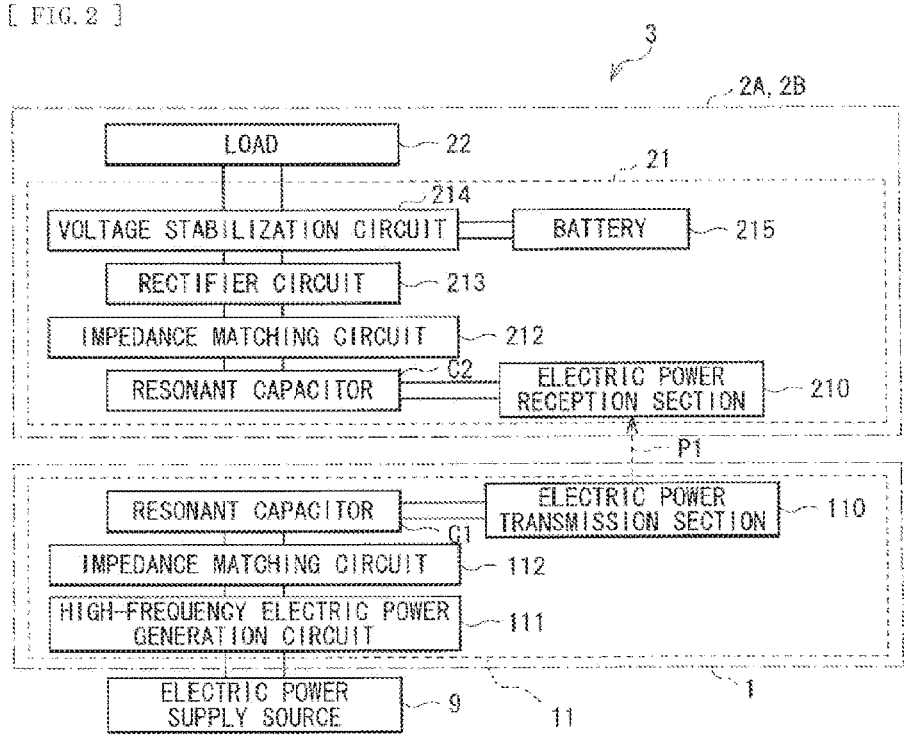

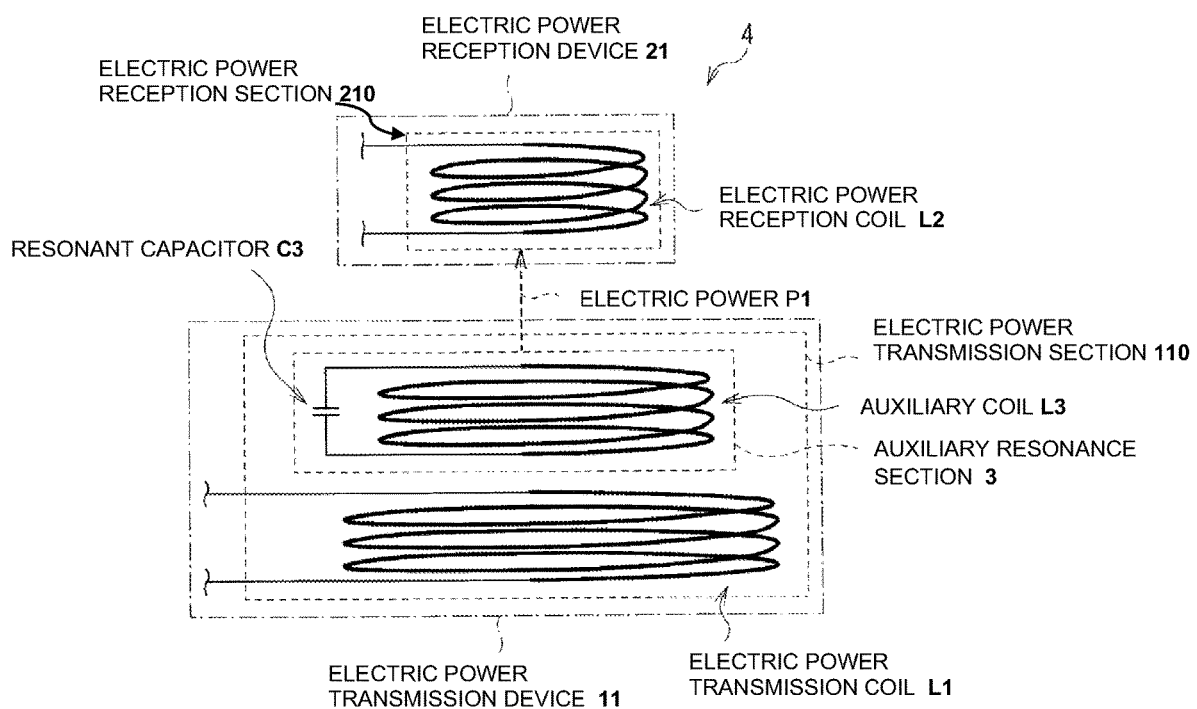
[ FIG. 3 ]

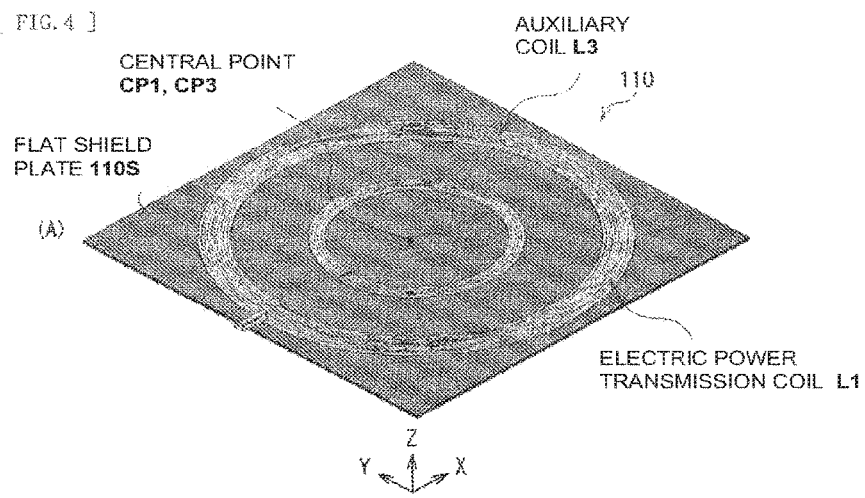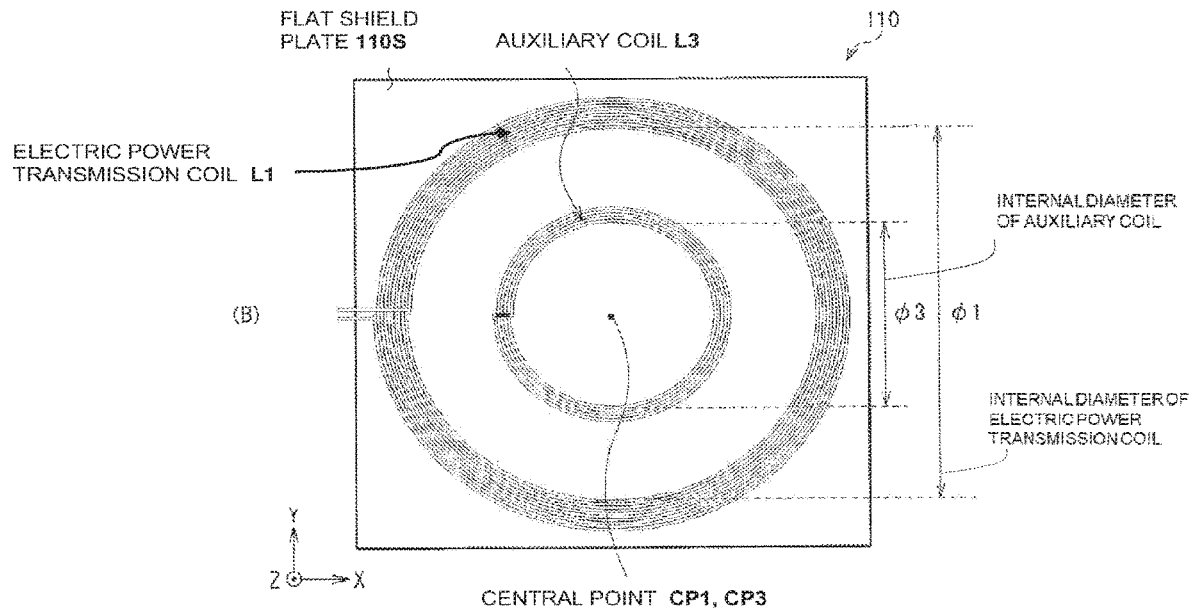
[FIG. 4]

[ FIG. 5 ]
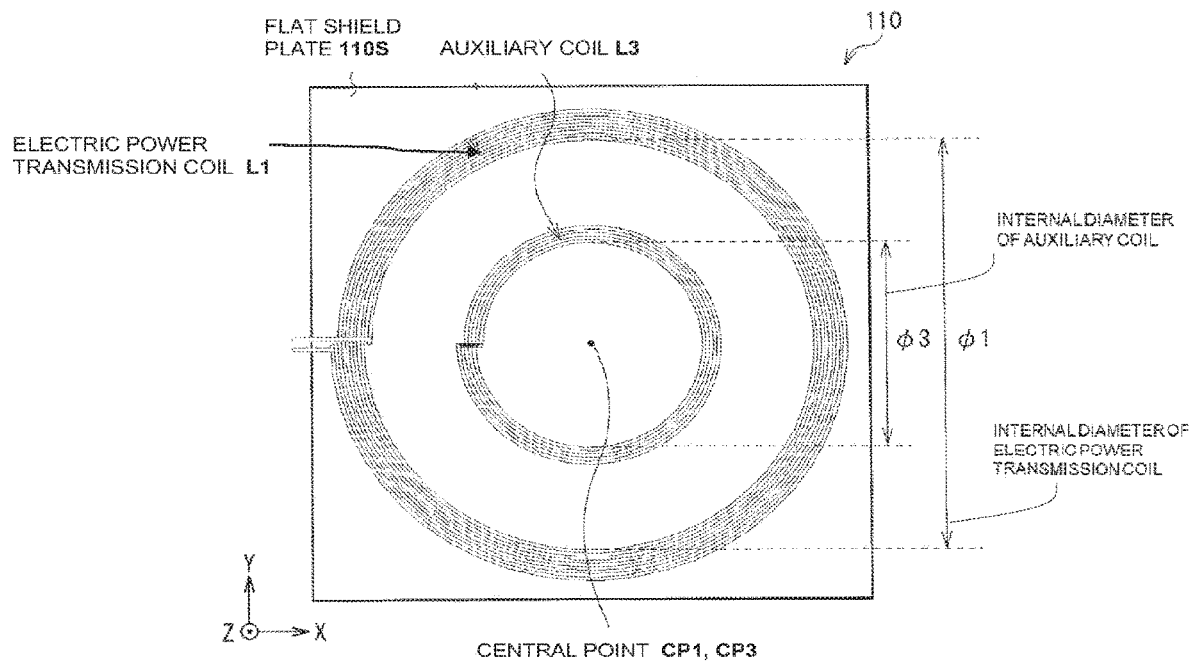
[ FIG. 6 ]
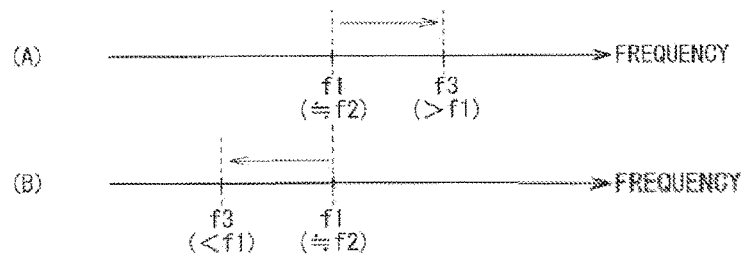

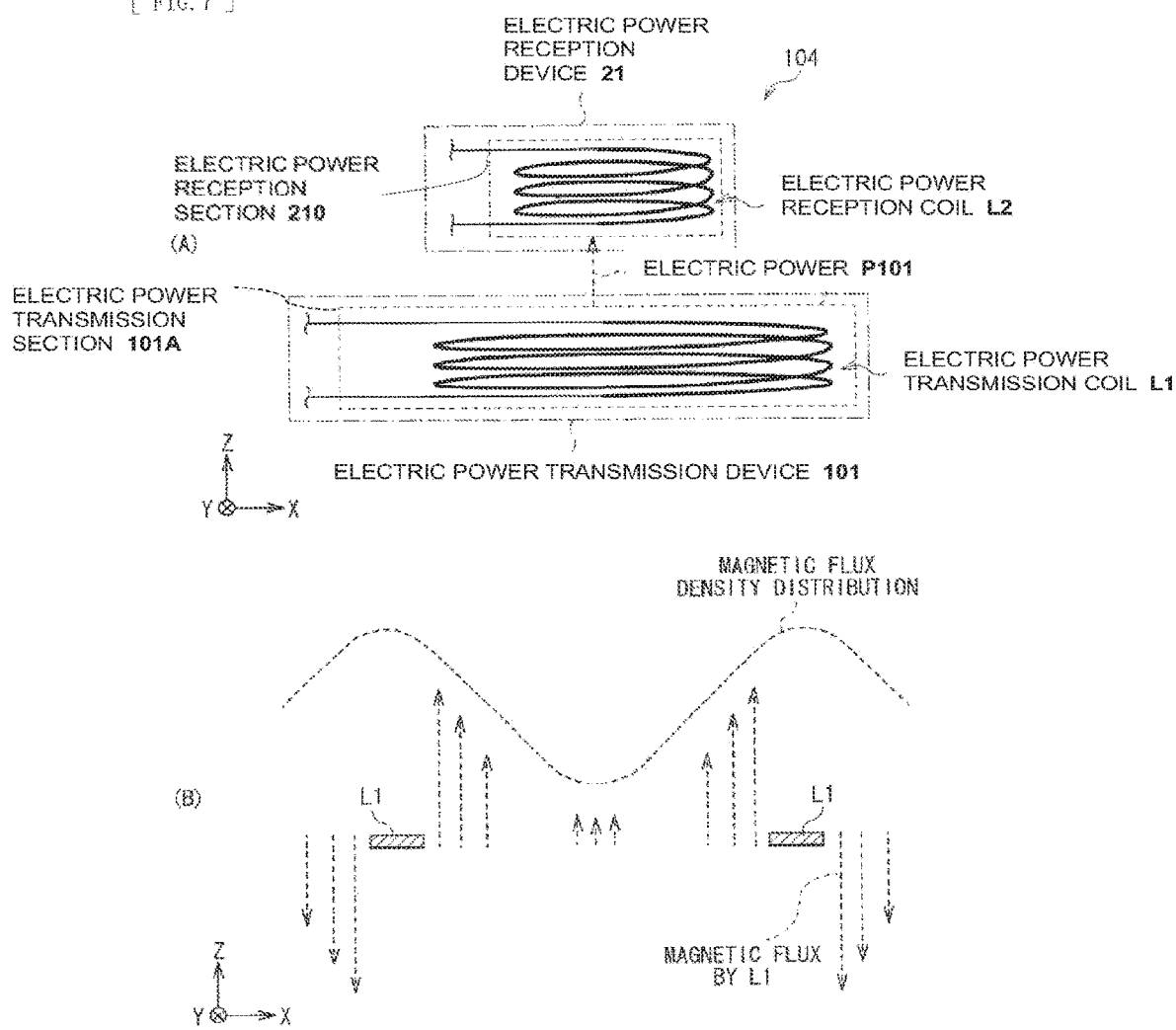

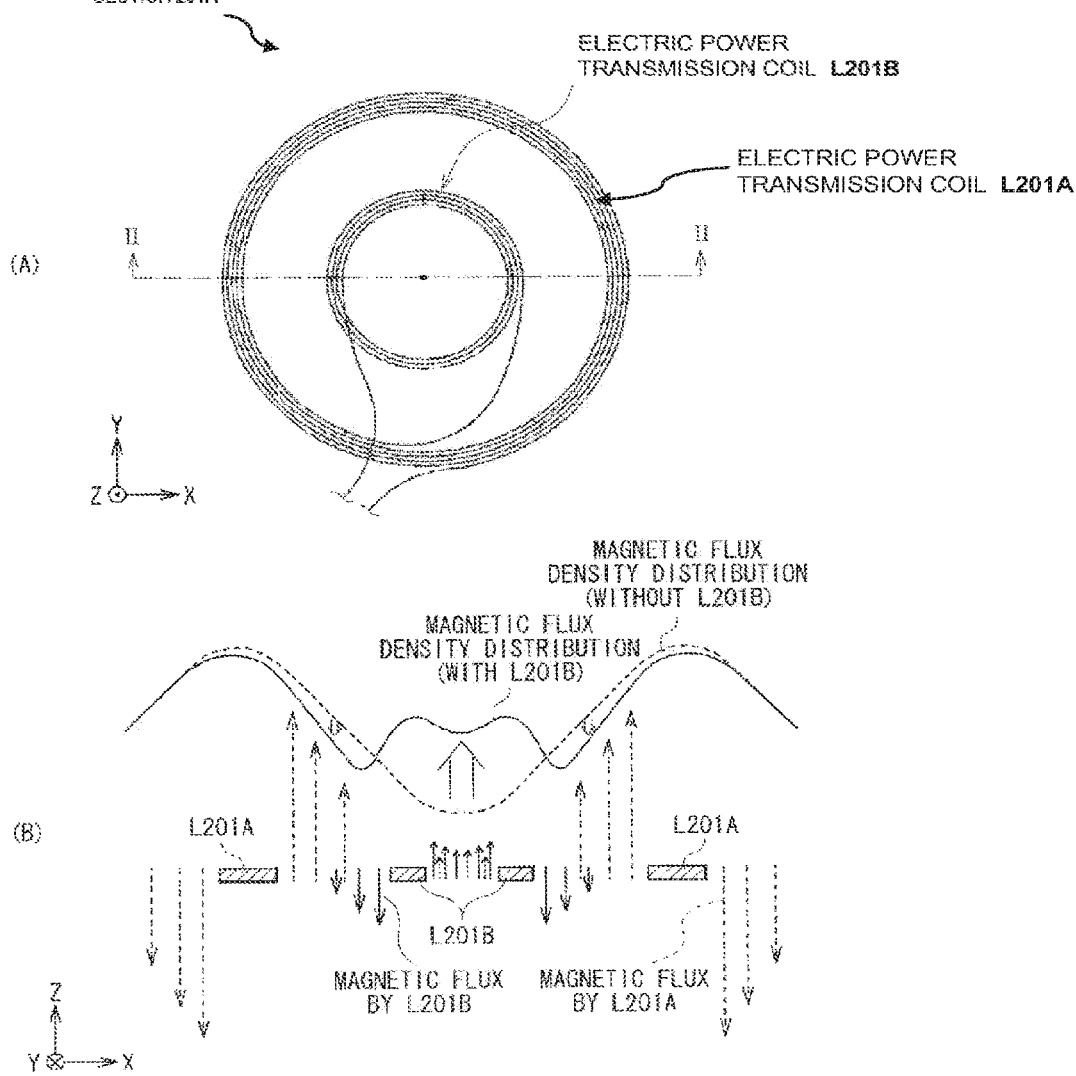

[ FIG. 9 ]
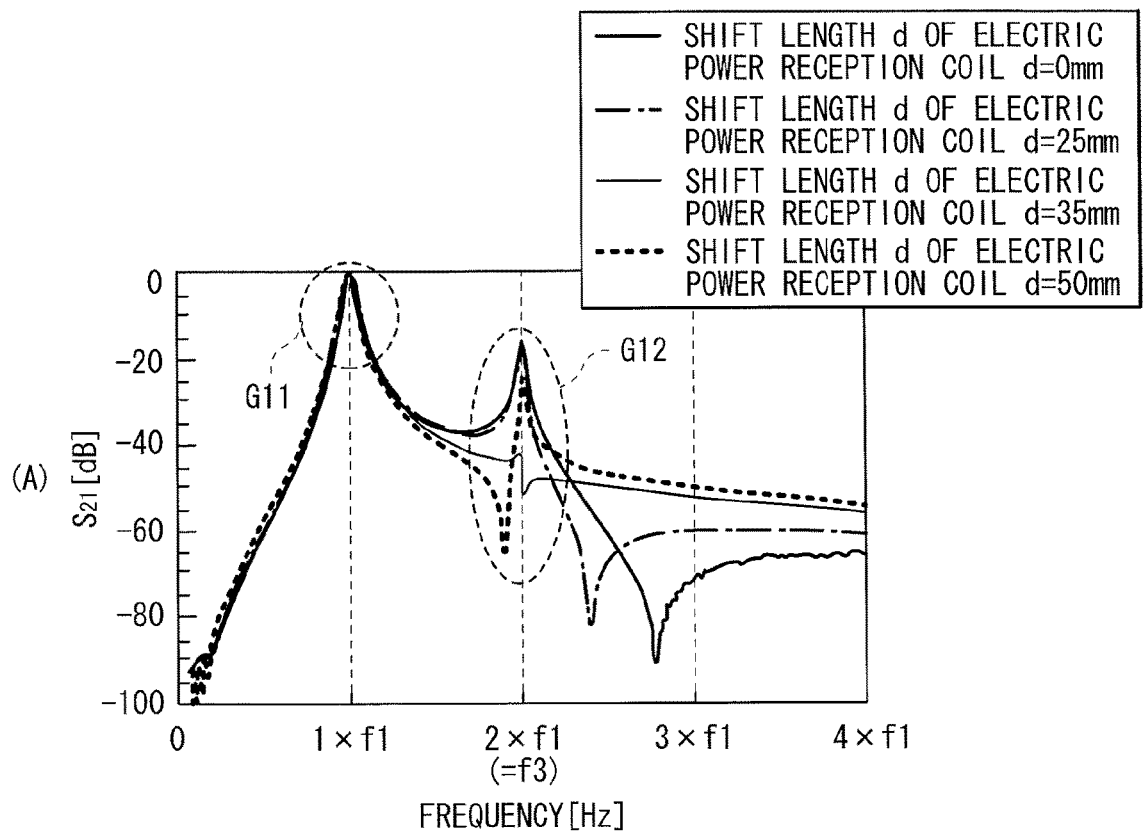
(A)
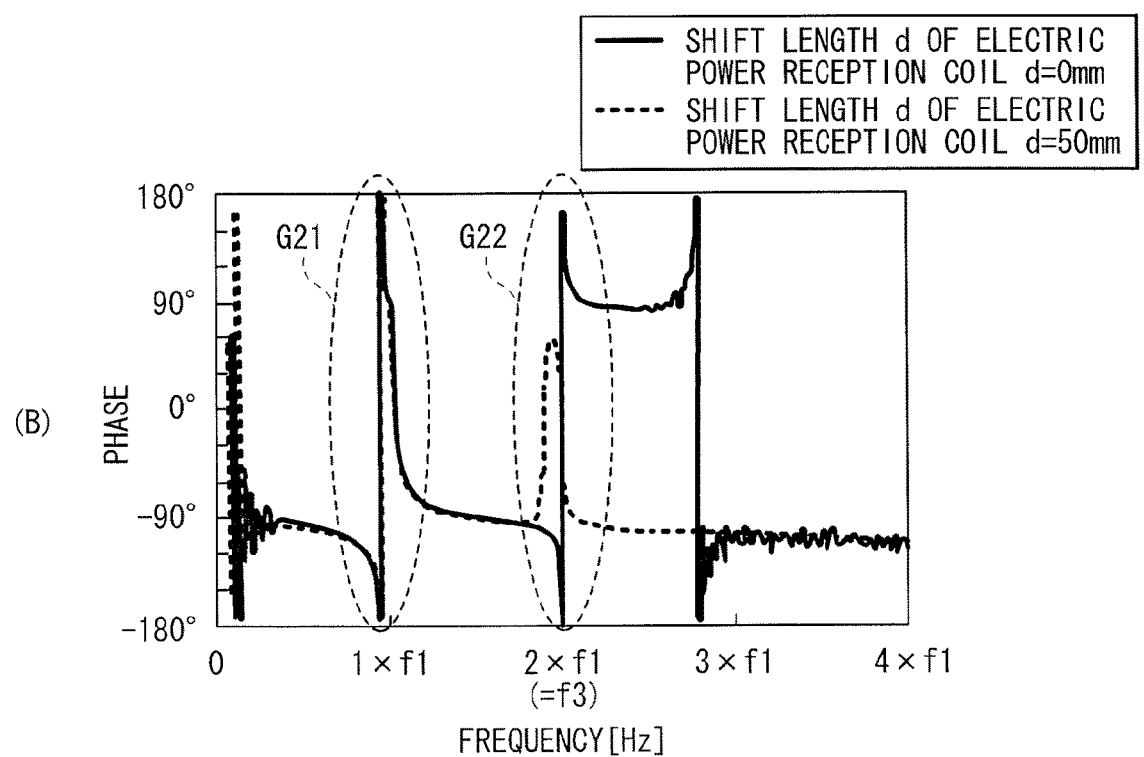
(B)

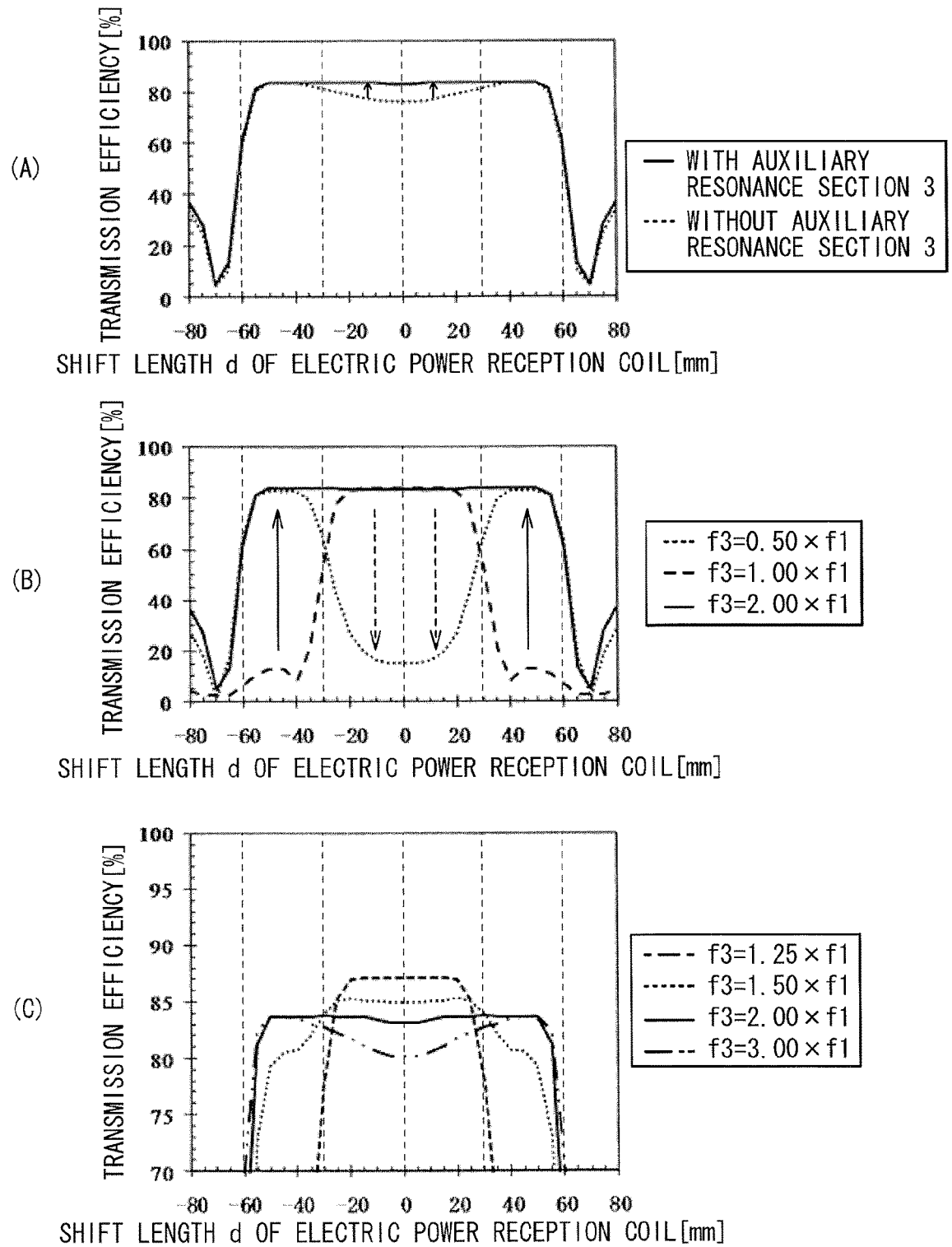
[FIG. 10]

[ FIG. 11 ]
(A) 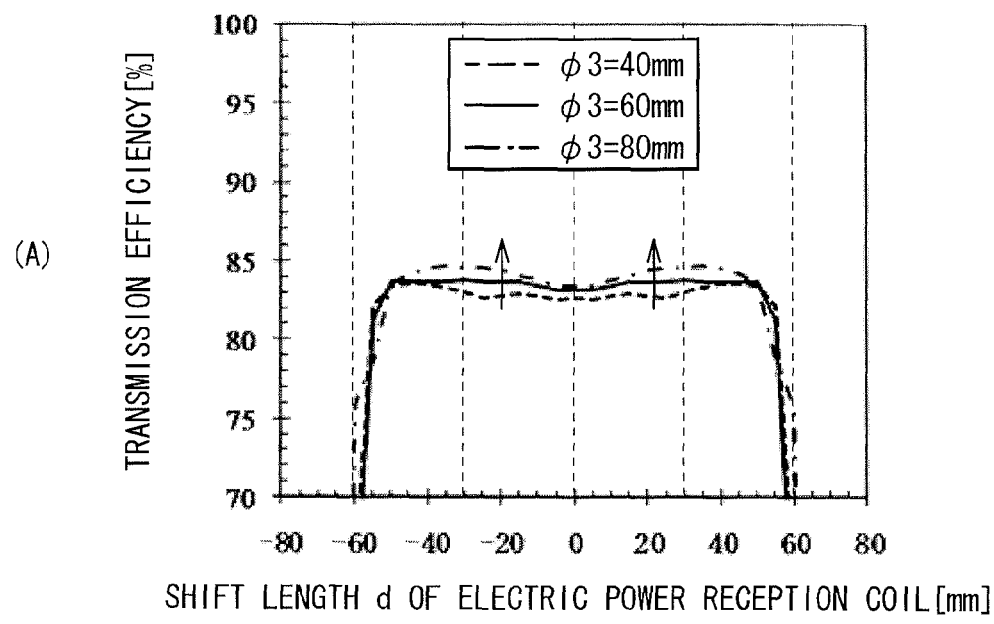
(B) 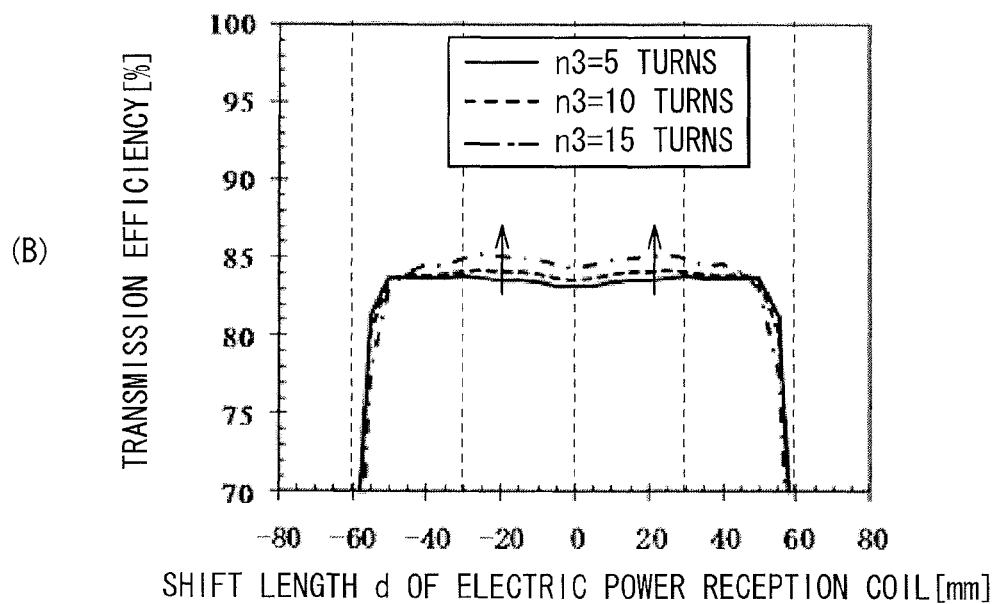

[ FIG. 12 ]
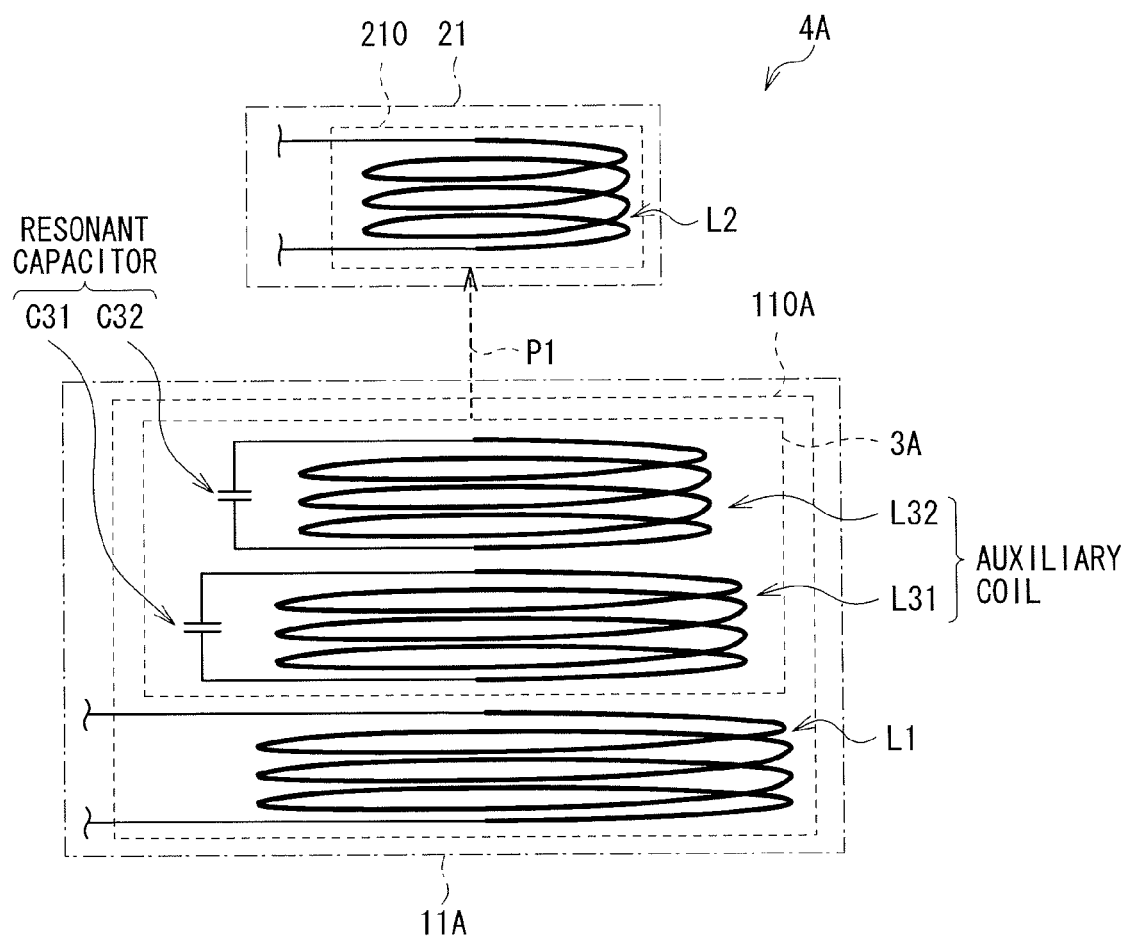

[FIG. 13]
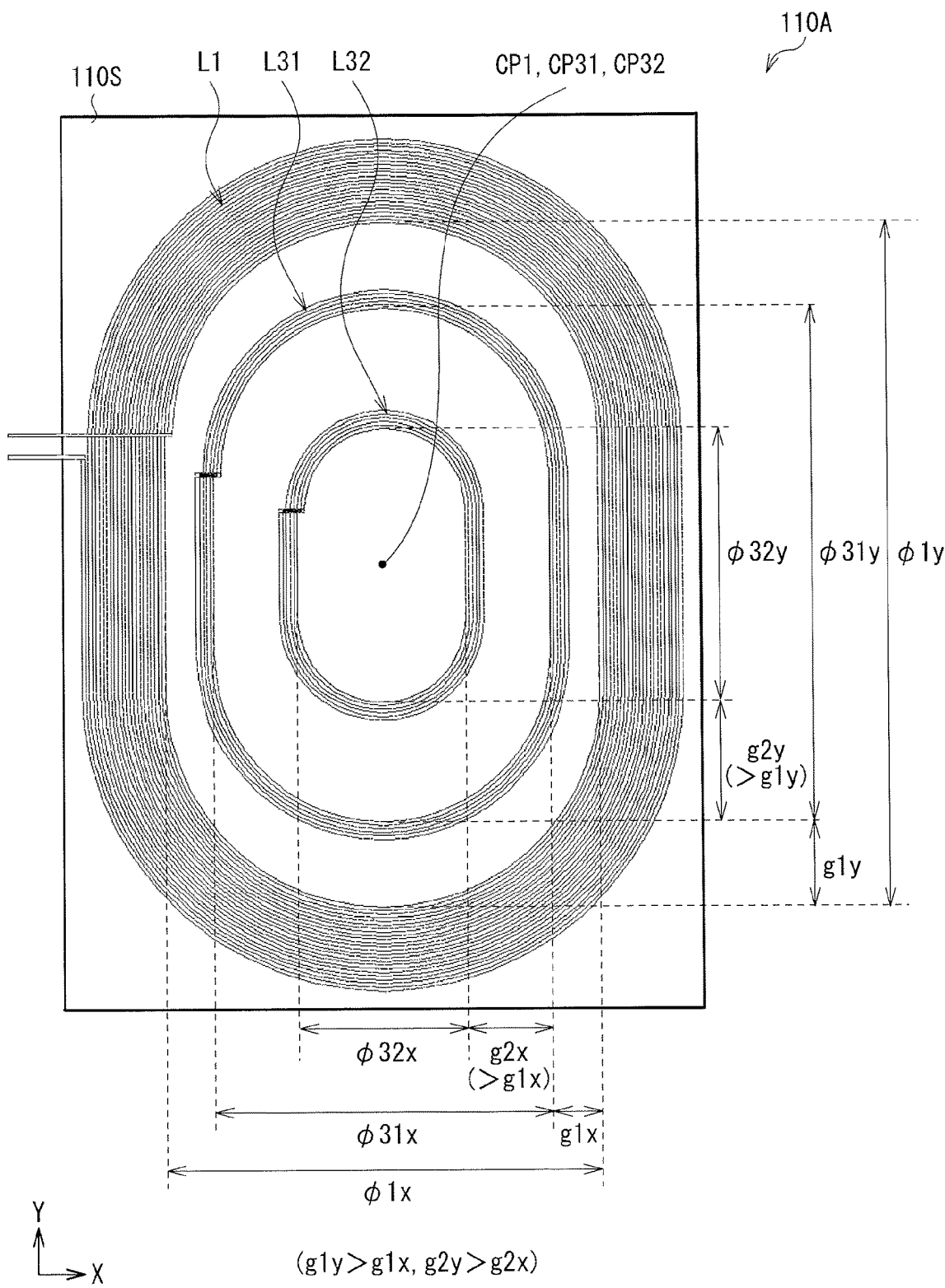

[ FIG. 14 ]
(A) f1 < (f31, f32)
((f31=f32) or (f31<f32) or (f31>f32))
(B) f1 > (f31, f32)
((f31=f32) or (f31<f32) or (f31>f32))
[ FIG. 15 ]
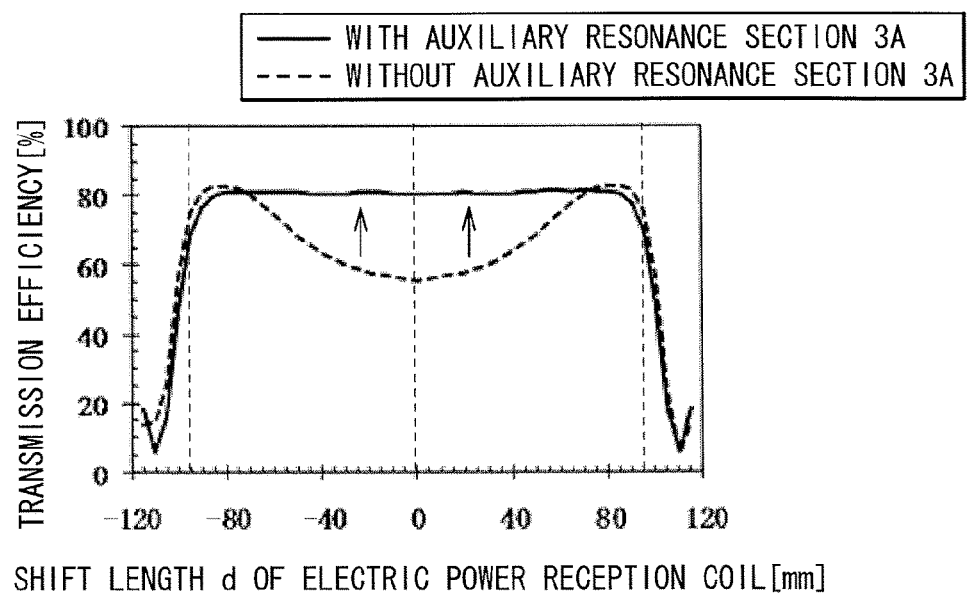

[FIG. 16]
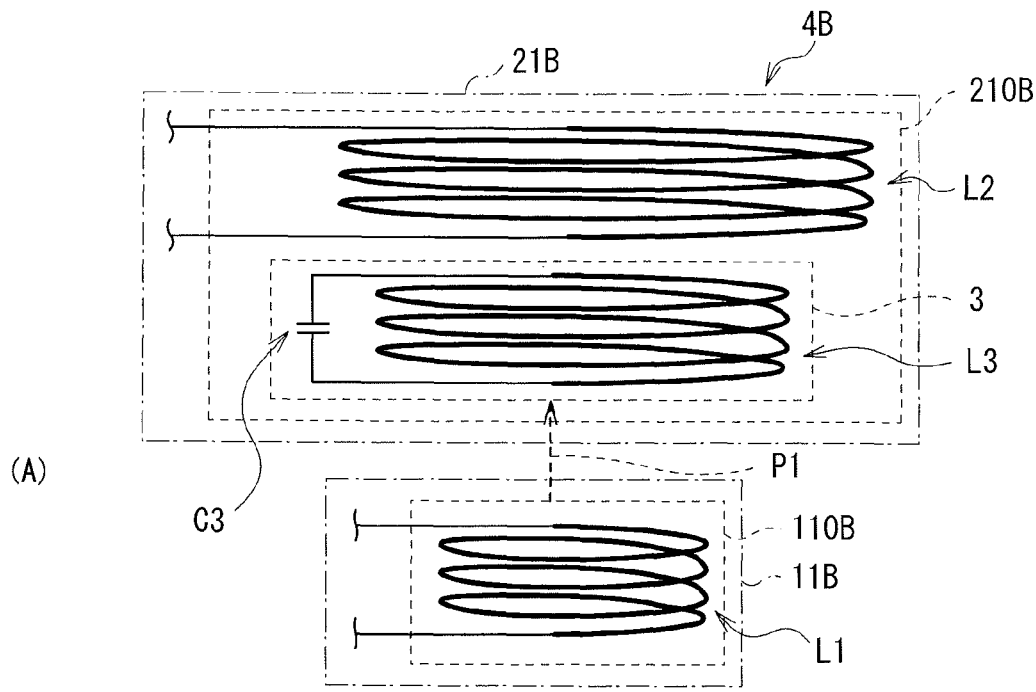
(A)
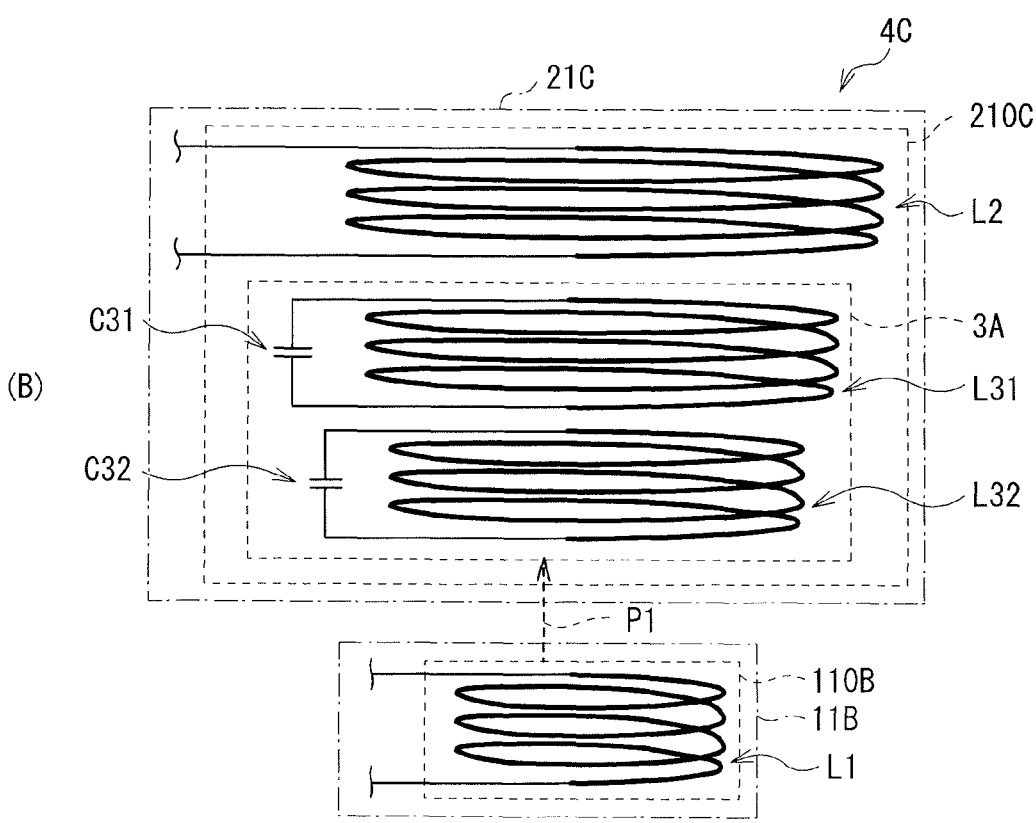
(B)

[ FIG. 17 ]
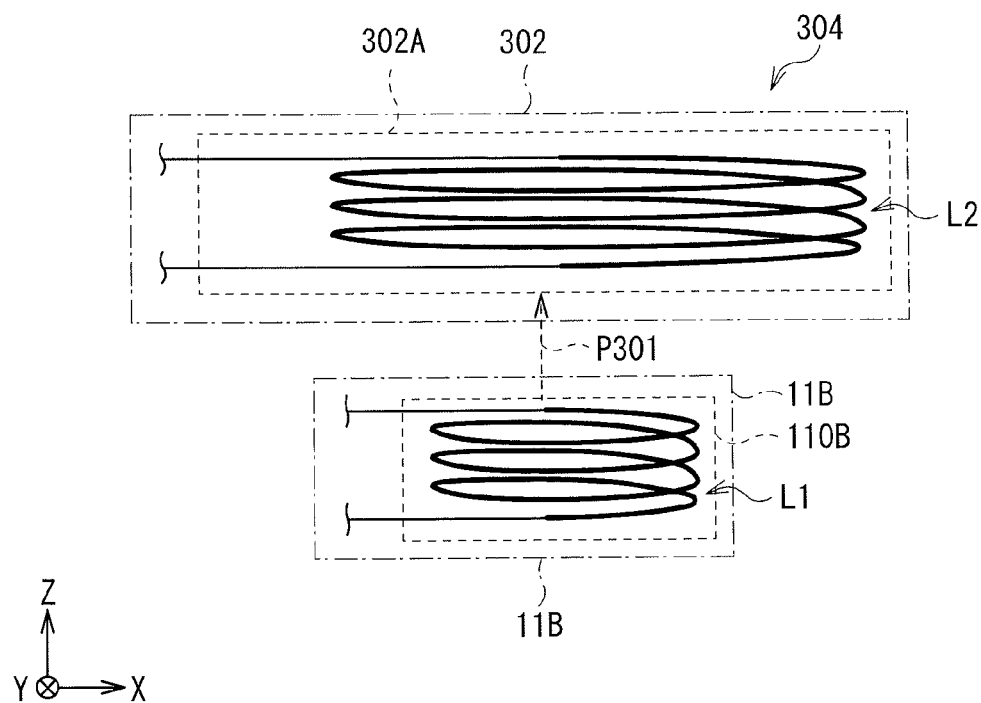

[FIG. 18]
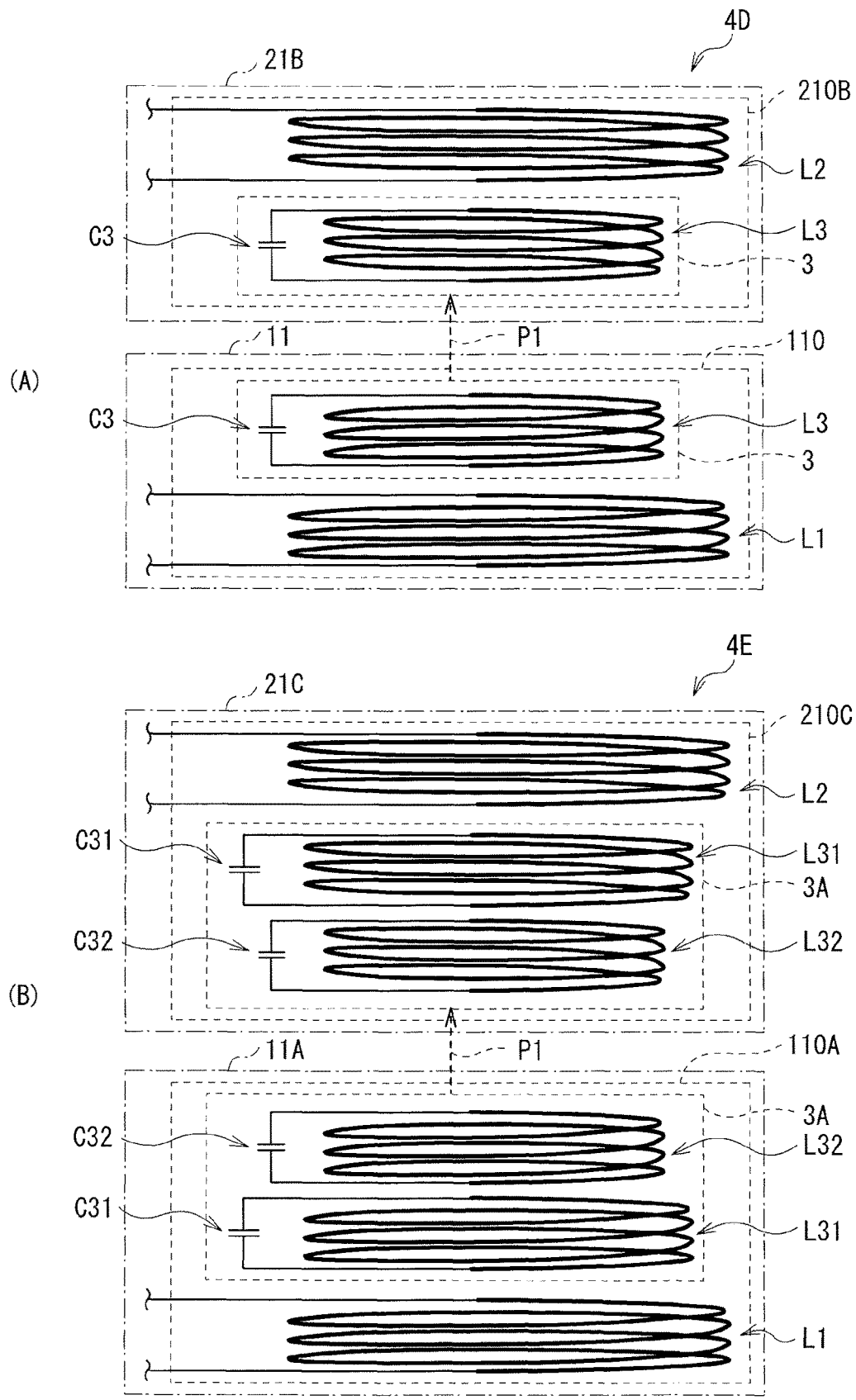

[ FIG. 19 ]
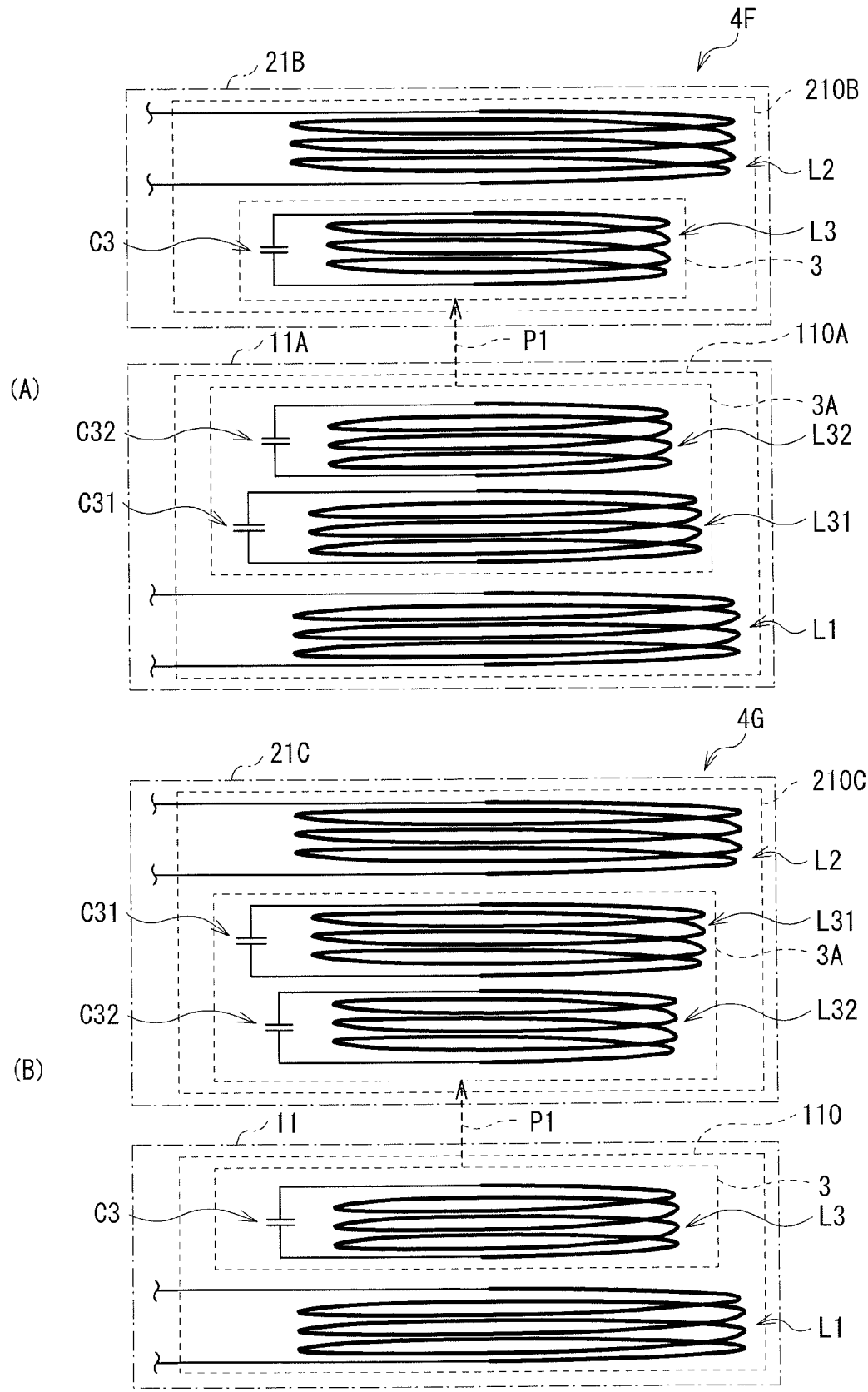

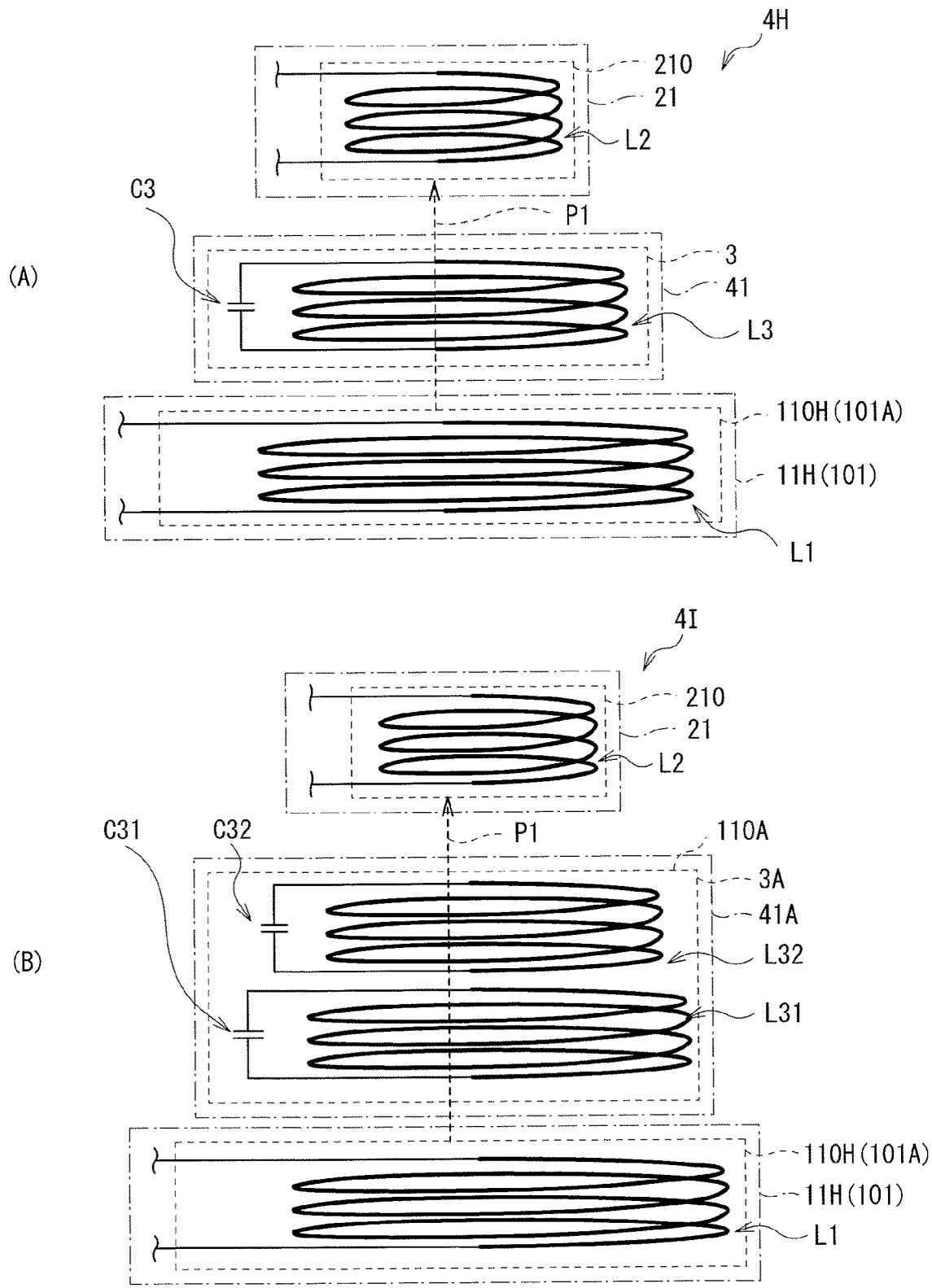
[FIG. 20]

[FIG. 21]
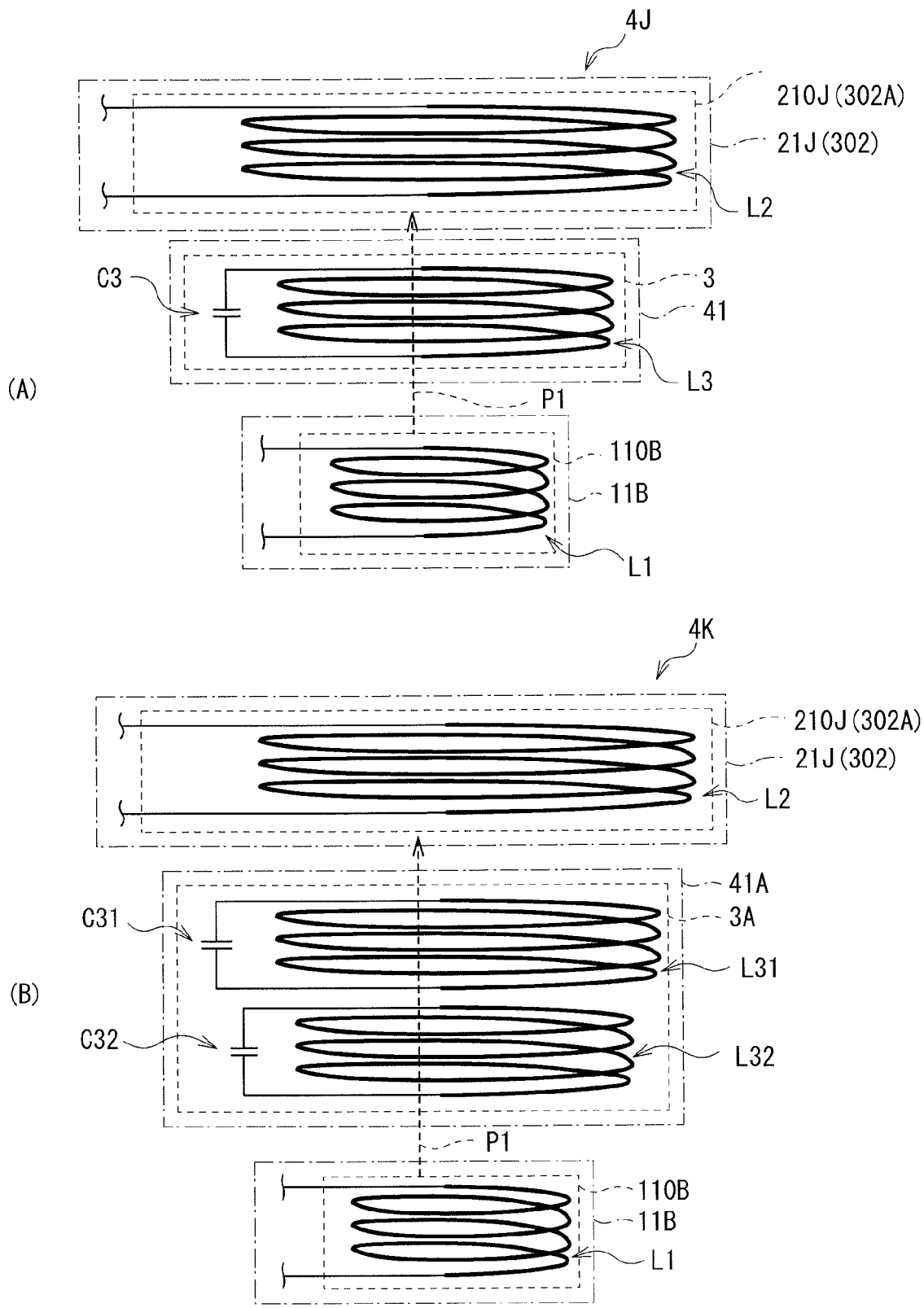

ELECTRIC POWER FEED APPARATUS, ELECTRIC POWER FEED SYSTEM, AND ELECTRONIC APPARATUS

TECHNICAL FIELD

The present disclosure relates to an electric power feed system performing noncontact electric power supply (electric power transmission) to an electronic apparatus, and an electric power feed apparatus and an electronic apparatus which are applied to such an electric power feed system.

BACKGROUND ART

In recent years, attention has been given to electric power feed systems (noncontact electric power feed systems and wireless charging systems) performing noncontact electric power supply (electric power transmission) to, for example, CE devices (Consumer Electronics Devices) including cellular phones and portable music players. These electric power feed systems are allowed to start charge only through placing an electronic apparatus (a secondary-side apparatus) on a charging tray (a primary-side apparatus), instead of starting charge through inserting (connecting) a connector of a power supply apparatus such as an AC adapter into the electronic apparatus. In other words, terminal connection between the electronic apparatus and the charging tray is not necessary.

As a system performing noncontact electric power supply in such a manner, an electromagnetic induction type is well known. Moreover, recently, attention has been given to noncontact electric power feed systems with use of a type called a magnetic resonance type employing an electromagnetic resonance phenomenon.

At present, in electromagnetic induction type noncontact electric power feed systems which have been already widely used, an electric power feed source (an electric power transmission coil) and an electric power destination (an electric power reception coil) need to share a magnetic flux. Therefore, to efficiently perform electric power supply, the electric power feed source and the electric power destination need to be disposed extremely close to each other, and axis alignment for coupling is also important.

On the other hand, noncontact electric power feed systems employing the electromagnetic resonance phenomenon have an advantage, based on the principle of the electromagnetic resonance phenomenon, that electric power is allowed to be transmitted to a longer distance, compared to the electromagnetic induction type, and even if axis alignment is slightly insufficient, transmission efficiency is not reduced so much. It is to be noted that types employing the electromagnetic resonance phenomenon include an electric resonance type, in addition to the magnetic resonance type. In noncontact electric power feed systems with use of the magnetic resonance type (for example, refer to PTL 1 and PTL 2), strict axis alignment is not necessary, and an electric power feeding distance is allowed to be increased.

CITATION LIST

Patent Literature

[PTL 1] Japanese Unexamined Patent Application Publication No. 2008-136311
[PTL 2] Japanese Unexamined Patent Application Publication (Published Japanese

SUMMARY

Incidentally, in a typical coil formed through winding a conductive wire or the like, a magnetic force line (magnetic flux) distribution is denser with decreasing distance to a coil end, thereby allowing a magnetic field to be stronger. On the other hand, the magnetic force line distribution is sparser with increasing distance from the coil end, thereby allowing the magnetic field to be weaker. Therefore, in a spiral coil or the like formed through flatly winding a wire, in a case where an internal diameter of the coil is sufficiently large, the magnetic field is strongest around a conductor located at an inner end of the coil, and the magnetic field is relatively weak around a central portion of the coil. Thus, the magnetic force line distribution generated by the coil is typically nonuniform.

To improve flexibility in a relative position between a primary-side apparatus (an electric power transmission side) and a secondary-side apparatus (an electric power reception side) (for example, flexibility in a position of the secondary-side apparatus on an electric power feed surface of the primary-side apparatus) during electric power transmission in the above-described noncontact electric power feed system through a magnetic field (such as magnetic resonance), the following technique may be used. Namely, it is a technique in which an internal diameter of an electric power transmission coil or the like is increased to expand a region where magnetic force lines are allowed to be distributed.

However, for example, in a case where the internal diameter of the electric power transmission coil is relatively large with respect to an internal diameter of an electric power reception coil, as described above, the magnetic force line distribution (a magnetic flux density distribution) in an internal region of the electric power transmission coil is nonuniform. Therefore, there is an issue that electric power feeding efficiency (transmission efficiency) in noncontact electric power feeding becomes nonuniform depending on the relative position between the primary-side apparatus and the secondary-side apparatus (for example, the position of the secondary-side apparatus).

Therefore, a proposal of a technique allowing transmission efficiency control corresponding to a position of an apparatus (for example, a reduction in nonuniformity of a transmission efficiency distribution corresponding to the above-described relative position) during electric power transmission (noncontact electric power feeding) through a magnetic field is desired.

Therefore, it is desirable to provide an electric power feed apparatus, an electric power feed system, and an electronic apparatus each of which is capable of performing transmission efficiency control corresponding to a position of an apparatus when electric power transmission is performed between apparatuses through a magnetic field.

An electric power feed apparatus according to an embodiment of the present disclosure includes an electric power transmission section including an electric power transmission coil for performing electric power transmission through a magnetic field and an auxiliary resonance section including one or a plurality of resonators, in which a main resonant frequency in a main resonance operation with use of the electric power transmission coil during the electric power transmission and an auxiliary resonant frequency in the resonator are different from each other.

An electric power feed system according to an embodiment of the present disclosure includes: one or a plurality of electronic apparatuses; and an electric power feed apparatus performing electric power transmission to the electronic apparatuses, in which the electric power feed apparatus includes an electric power transmission section including an electric power transmission coil for performing electric power transmission through a magnetic field, the electronic apparatuses each includes an electric power reception section including an electric power reception coil for receiving electric power transmitted from the electric power transmission section, and an auxiliary resonance section is included in one or more of the electric power feed apparatus, the electronic apparatus, and another apparatus as a separate body from the electric power feed apparatus and the electronic apparatus, the auxiliary resonance section including one or a plurality of resonators that each have an auxiliary resonant frequency different from a main resonant frequency in a main resonance operation with use of the electric power transmission coil or the electric power reception coil during the electric power transmission.

An electronic apparatus according to an embodiment of the present disclosure includes an electric power reception section including an electric power reception coil for receiving electric power transmitted through a magnetic field and an auxiliary resonance section including one or a plurality of resonators, in which a main resonant frequency in a main resonance operation with use of the electric power reception coil during the electric power transmission and an auxiliary resonant frequency in the resonator are different from each other.

In the electric power feed apparatus, the electric power feed system, and the electronic apparatus according to the embodiments of the present disclosure, the main resonant frequency in the main resonance operation during electric power transmission through a magnetic field and the auxiliary resonant frequency in one or a plurality of resonators in the auxiliary resonance section are different from each other. Therefore, a relationship (position characteristics) between a relative position between the electric power feed apparatus (an electric power transmission side) and an electronic apparatus (an electric power reception side) and transmission efficiency during electric power transmission is varied by adjustment of a difference between such resonance frequencies.

In the electric power feed apparatus, the electric power feed system, and the electronic apparatus according to the embodiments of the present disclosure, the above-described auxiliary resonant frequency may be higher than the above-described main resonant frequency. With such a configuration, variation in transmission efficiency with respect to variation in the above-described relative position (nonuniformity in transmission efficiency depending on the relative position) is reduced. In other words, compared to a case where the auxiliary resonant frequency and the main resonant frequency are equal to each other, flattening (uniformization) of a transmission efficiency distribution corresponding to the relative position is achieved.

In the electric power feed apparatus, the electric power feed system, and the electronic apparatus according to the embodiments of the present disclosure, the main resonant frequency in the main resonance operation during electric power transmission through a magnetic field and the auxiliary resonant frequency in the one or the plurality of resonators in the auxiliary resonance section are different from each other; therefore, a relationship between the relative position between the electric power transmission side and the electric power reception side and transmission efficiency during electric power transmission is allowed to be varied by adjustment of a difference between such resonance frequencies. Accordingly, when electric power transmission is performed between apparatuses through a magnetic field, transmission efficiency control corresponding to the positions of the apparatuses is allowed to be performed.

BRIEF DESCRIPTION OF DRAWINGS

FIG. 1 is a perspective view illustrating an outline configuration example of an electric power feed system according to a first embodiment of the present disclosure.

FIG. 2 is a block diagram illustrating a specific configuration example of the electric power feed system illustrated in FIG. 1.

FIG. 3 is a schematic view illustrating schematic configuration examples of an electric power transmission section and an electric power reception section illustrated in FIG. 1.

FIG. 4 is a perspective view and a plan view illustrating a specific configuration example of the electric power transmission section illustrated in FIG. 3.

FIG. 5 is a plan view illustrating another specific configuration example of the electric power transmission section illustrated in FIG. 3.

FIG. 6 is a diagram for describing a relationship between resonant frequencies in the electric power transmission section illustrated in FIG. 3.

FIG. 7 is a diagram illustrating a schematic configuration and electric power transmission characteristics of an electric power feed system according to Comparative Example 1.

FIG. 8 is a diagram illustrating a schematic configuration and electric power transmission characteristics of an electric power transmission section of an electric power feed system according to Comparative Example 2.

FIG. 9 is a characteristic diagram illustrating an example of data according to an example of the first embodiment.

FIG. 10 is a characteristic diagram illustrating another example of data according to the example of the first embodiment.

FIG. 11 is a characteristic diagram illustrating still another example of data according to the example of the first embodiment.

FIG. 12 is a schematic view illustrating a schematic configuration example of an electric power feed system according to a second embodiment.

FIG. 13 is a plan view illustrating a specific configuration example of an electric power transmission section illustrated in FIG. 12.

FIG. 14 is a diagram for describing a relationship between resonant frequencies in the electric power transmission section illustrated in FIG. 12.

FIG. 15 is a characteristic diagram illustrating an example of data according to an example of the second embodiment.

FIG. 16 is a schematic view illustrating schematic configuration examples of electric power feed systems according to a third embodiment.

FIG. 17 is a schematic view illustrating a schematic configuration example of an electric power feed system according to Comparative Example 3.

FIG. 18 is a schematic view illustrating schematic configuration examples of electric power feed systems according to a fourth embodiment.

FIG. 19 is a schematic view illustrating other schematic configuration examples of electric power feed systems according to the fourth embodiment.

FIG. 20 is a schematic view illustrating schematic configuration examples of electric power feed systems according to a fifth embodiment.

FIG. 21 is a schematic view illustrating other schematic configuration examples of electric power feed systems according to the fifth embodiment.

DESCRIPTION OF EMBODIMENTS

Some embodiments of the present disclosure will be described in detail below referring to the accompanying drawings. It is to be noted that description will be given in the following order.
1. First Embodiment (An example in which an auxiliary resonance section including one resonator is included in a primary-side apparatus)
2. Second Embodiment (An example in which an auxiliary resonance section including a plurality of resonators is included in the primary-side apparatus)
3. Third Embodiment (An example in which an auxiliary resonance section is included in a secondary-side apparatus)
4. Fourth Embodiment (An example in which an auxiliary resonance section is included in each of the primary-side apparatus and the secondary-side apparatus)
5. Fifth Embodiment (An example in which an auxiliary resonance section is provided as a separate body from the primary-side apparatus and the secondary-side apparatus)
6. Modification Examples First Embodiment (Entire Configuration of Electric Power Feed System 4)

FIG. 1 illustrates an outline configuration example of an electric power feed system (an electric power feed system 4) according to a first embodiment of the present disclosure, and FIG. 2 illustrates a block configuration example of the electric power feed system 4. The electric power feed system 4 is a system (a noncontact electric power feed system) performing noncontact electric power transmission (electric power supply, or electric power feeding) through a magnetic field (through magnetic resonance or the like, which also applies to the description hereinafter). The electric power feed system 4 includes an electric power feed apparatus 1 (a primary-side apparatus) and one or a plurality of electronic apparatuses (here, two electronic apparatuses 2A and 2B; secondary-side apparatuses).

In this electric power feed system 4, for example, as illustrated in FIG. 1, when the electronic apparatuses 2A and 2B are placed on (or close to) an electric power feed surface (an electric power transmission surface) S1 of the electric power feed apparatus 1, electric power is transmitted from the electric power feed apparatus 1 to the electronic apparatuses 2A and 2B. In this case, the electric power feed apparatus 1 has a mat shape (a tray shape) with a larger area of the electric power feed surface S1 than an area of each of the electronic apparatuses 2A and 2B, and the like as electric power feed targets in consideration of a case where electric power is transmitted to a plurality of electronic apparatuses 2A and 2B simultaneously or in a time-divisional manner (sequentially).

(Electric Power Feed Apparatus 1)

As described above, the electric power feed apparatus 1 is an apparatus (a charging tray) performing electric power transmission to the electronic apparatuses 2A and 2B through a magnetic field. For example, as illustrated in FIG. 2, the electric power feed apparatus 1 includes an electric power transmission device 11 including an electric power transmission section 110, a high-frequency electric power generation circuit 111, an impedance matching circuit 112, and a resonant capacitor C1 (a capacitor element).

The electric power transmission section 110 is configured through including an electric power transmission coil (a primary-side coil) L1 which will be described later and the like. The electric power transmission section 110 performs electric power transmission to the electronic apparatuses 2A and 2B (more specifically, an electric power reception section 210 which will be described later) through a magnetic field with use of the electric power transmission coil L1 and the resonant capacitor C1. More specifically, the electric power transmission section 110 has a function of emitting a magnetic field (a magnetic flux) from the electric power feed surface S1 toward the electronic apparatuses 2A and 2B. It is to be noted that a specific configuration of the electric power transmission section 110 will be described later (refer to FIGS. 3 to 6).

The high-frequency electric power generation circuit 111 is a circuit generating predetermined high-frequency electric power (an AC signal) for performing electric power transmission with use of electric power supplied from, for example, an external electric power supply source 9 of the electric power feed apparatus 1.

The impedance matching circuit 112 is a circuit performing impedance matching when electric power transmission is performed. Efficiency (transmission efficiency) during electric power transmission is thereby improved. It is to be noted that the impedance matching circuit 112 may not be provided, depending on configurations of the electric power transmission coil L1, an electric power reception coil L2 which will be described later, resonant capacitors C1 and C2, and the like.

The resonant capacitor C1 is a capacitor element for configuring an LC resonator (a main resonator, or a main resonant circuit) together with the electric power transmission coil L1, and is disposed to be electrically connected to the electric power transmission coil L1 directly, in parallel, or in a combination of parallel and series. The LC resonator configured of the electric power transmission coil L1 and the resonant capacitor C1 performs a resonance operation (a main resonance operation) by a resonant frequency (a main resonance frequency) f1 substantially equal to or close to a frequency of high-frequency electric power generated by the high-frequency electric power generation circuit 111. Moreover, a capacity value of the resonant capacitor C1 is set to have such a resonant frequency f1. However, if the above-described resonant frequency f1 is achieved by a main resonance operation with use of a parasitic capacitance component (a stray capacitance component) configured of line capacity in the electric power transmission coil L1, capacity between the electric power transmission coil L1 and the electric power reception coil L2 which will be described later, or the like, the resonant capacitor C1 may not be provided.

(Electronic Apparatuses 2A and 2B)

The electronic apparatuses 2A and 2B each may be, for example, a stationary electronic apparatus, typified by a television receiver, or a portable electronic apparatus including a rechargeable battery, typified by a cellular phone or a digital camera. For example, as illustrated in FIG. 2, each of the electronic apparatuses includes an electric power reception device 21 and a load 22 performing a predetermined operation (an operation exhibiting a function as an electronic apparatus) based on electric power supplied from the electric power reception device 21. Moreover, the electric power reception device 21 includes an electric power reception section 210, an impedance matching circuit 212, a rectifier circuit 213, a voltage stabilization circuit 214, a battery 215, and the resonant capacitor (a capacitor element) C2.

The electric power reception section 210 is configured through including the electric power reception coil (a secondary-side coil) L2 which will be described later. The electric power reception section 210 has a function of receiving electric power transmitted from the electric power transmission section 110 in the electric power feed apparatus 1 with use of the electric power reception coil L2 and the resonant capacitor C2. It is to be noted that a specific configuration of the electric power reception section 210 will be described later (refer to FIG. 3).

The impedance matching circuit 212 is a circuit performing impedance matching when electric power transmission is performed, as with the above-descried impedance matching circuit 112. It is to be noted that the impedance matching circuit 212 may not be provided, depending on configurations of the electric power transmission coil L1, the electric power reception coil L2 which will be described later, the resonant capacitors C1 and C2, and the like.

The rectifier circuit 213 is a circuit rectifying electric power (AC electric power) supplied from the electric power reception section 210 to generate DC electric power.

The voltage stabilization circuit 214 is a circuit performing a predetermined voltage stabilization operation based on DC electric power supplied from the rectifier circuit 213 to charge the battery 215 or a battery (not illustrated) in the load 22.

The battery 215 holds electric power by charge from the voltage stabilization circuit 214, and is configured with use of, for example, a rechargeable battery (a secondary battery) such as a lithium-ion battery. It is to be noted that, in a case where only the battery in the load 22 is used, or the like, the battery 215 may not be necessarily provided.

The resonant capacitor C2 is a capacitor element for configuring an LC resonator (a main resonator, or a main resonant circuit) together with the electric power reception coil L2, and is disposed to be electrically connected to the electric power reception coil L2 directly, in parallel, or in a combination of parallel and series. The LC resonator configured of the electric power reception coil L2 and the resonant capacitor C2 performs a resonance operation by a resonant frequency f2 substantially equal to or close to the frequency of high-frequency electric power generated in the high-frequency electric power generation circuit 111. In other words, the LC resonator configured of the electric power transmission coil L1 and the resonant capacitor C1 in the electric power transmission device 11 and the LC resonator configured of the electric power reception coil L2 and the resonant capacitor C2 in the electric power reception device 21 perform the main resonance operations with resonant frequencies which are substantially equal to each other (f1 is substantially equal to f2). Moreover, a capacity value of the resonant capacitor C2 is set to have such a resonant frequency f2. However, if the above-described resonant frequency f2 is achieved by a main resonance operation with use of a parasitic capacitance component configured of line capacity in the electric power reception coil L2, capacity between the electric power transmission coil L1 and the electric power reception coil L2, or the like, the resonant capacitor C2 may not be also provided.

(Specific Configurations of Electric Power Transmission Section 110 and Electric Power Reception Section 210)

FIG. 3 schematically illustrates schematic configurations of the electric power transmission section 110 and the electric power reception section 210. The electric power transmission section 110 includes the electric power transmission coil L1 and an auxiliary resonance section 3, and the electric power reception section 210 includes the electric power reception coil L2.

As described above, the electric power transmission coil L1 is a coil for performing electric power transmission (generating a magnetic flux) through a magnetic field. On the other hand, the electric power reception coil L2 is a coil for receiving electric power (from the magnetic flux) transmitted from the electric power transmission section 110.

The auxiliary resonance section 3 performs a predetermined resonance operation (an auxiliary resonance operation), and in this case, the auxiliary resonance section 3 includes one LC resonator (an auxiliary resonator, an auxiliary resonant circuit) configured of one auxiliary coil L3 and one resonant capacitor C3 (a capacitor element). Hereinafter, a resonant frequency (an auxiliary resonant frequency) in the auxiliary resonance operation in the LC resonator of the auxiliary resonance section 3 is represented by "f3". It is to be noted that, in a case where a predetermined parasitic capacitance component is used instead of the resonant capacitor C3, or the like, the resonant capacitor C3 in the auxiliary resonance section 3 may not be also provided.

(Specific Configuration of Electric Power Transmission Section 110)

FIG. 4 illustrates a specific configuration example of the power transmission section 110, where FIGS. 4(A) and 4(B) illustrate a perspective configuration example, and a plane configuration example (an X-Y plane configuration example), respectively. In the electric power transmission section 110, the above-described electric power transmission coil L1 and the above-described auxiliary coil L3 are disposed on a flat shield plate 110S so as to be insulated (physically and electrically insulated) from each other.

The shield plate 110S prevents unnecessary magnetic flux leakage to a region (here, on a lower side) not coupled (magnetically coupled) to the electric power reception coil L2, and is made of a magnetic material, a conductive material, or the like. However, in some cases, such a shield plate 110S may not be provided.

In this case, in the electric power transmission section 110, the electric power transmission coil L1 and the auxiliary coil L3 are disposed in a substantially same plane (here, a surface (a same plane) of the shield plate 110S). However, positions of the electric power transmission coil L1 and the auxiliary coil L3 are not limited thereto, and, for example, the auxiliary coil L3 may be disposed on a plane shifted along a direction (a Z-axis direction) perpendicular to a coil surface of the electric power transmission coil L1. In other words, the electric power transmission coil L1 and the auxiliary coil L3 may be disposed on different planes. When the electric power transmission coil L1 and the auxiliary coil L3 are disposed in such a manner, flexibility in design (position) of the auxiliary resonance section 3 is improved. On the other hand, as illustrated in FIG. 4, in a case where the electric power transmission coil L1 and the auxiliary coil L3 are disposed on a substantially same plane, a reduction in the thickness of the electric power transmission section 110 is achieved. The following description will be given with use of an example in which these coils are disposed on a same plane.

Moreover, as illustrated in FIG. 4, a central point CP1 of the electric power transmission coil L1 and a central point CP3 of the auxiliary coil L3 are located along a substantially same axis (the Z axis) (here, at a substantially same point). Thus, a configuration of the electric power transmission section 110 configured through including the electric power transmission coil L1 and the auxiliary coil L3 is substantially symmetric in an X-axis direction and a Y-axis direction; therefore, flattening (uniformization) of a transmission efficiency distribution corresponding to a relative position which will be described later (here, positions of the electronic apparatuses 2A and 2B with respect to the electric power feed apparatus 1) is easily achievable. Then, an internal diameter phi3 of the auxiliary coil L3 is smaller than an internal diameter phi1 of the electric power transmission coil L1 (phi3<phi1). Therefore, a magnetic field around a central portion, where a magnetic field is relatively weak without the auxiliary coil L3, of the electric power transmission coil L1 is allowed to be reinforced. Thus, the electric power transmission coil L1 and the auxiliary coil L3 are formed in concentric circles with internal diameters different from each other.

It is to be noted that the configurations of the electric power transmission coil L1 and the auxiliary coil L3 in the electric power transmission section 110 are not limited to those illustrated in FIGS. 4(A) and 4(B). Unlike a case where wires of the electric power transmission coil L1 and the auxiliary coil L3 are densely wound as illustrated in FIGS. 4(A) and 4(B), for example, as illustrated in FIG. 5, the wires of the electric power transmission coil L1 and the auxiliary coil L3 may be coarsely wound (predetermined gaps may be provided between windings of a wire). Moreover, the electric power transmission coil L1 and the auxiliary coil L3 each may be, for example, a coil rotating in a clockwise direction or a coil rotating in a counterclockwise direction, and it is not necessary for the electric power transmission coil L1 and the auxiliary coil L3 to rotate in a same direction. Further, the central point CP1 of the electric power transmission coil L1 and the central point CP3 of the auxiliary coil L3 may be displaced from each other so as not to be located along the same axis. In this case, an intentional difference in height is allowed to be provided to the transmission efficiency distribution corresponding to the relative position which will be described later (here, the positions of the electronic apparatuses 2A and 2B with respect to the electric power feed apparatus 1). In addition, the internal diameter phi3 of the auxiliary coil L3 may be equal to or larger than the internal diameter phi1 of the electric power transmission coil L1 (phi3=/>phi1). In this case, although a maximum value of transmission efficiency is reduced, a region where noncontact electric power feeding is possible is allowed to be expanded by relatively high transmission efficiency.

(Relationship Between Resonant Frequencies f1 and f3)

In this embodiment, as illustrated in FIGS. 6(A) and 6(B), the resonant frequency f1 (which is nearly equal to f2) in the main resonance operation with use of the electric power transmission coil L1 during electric power transmission and the resonance frequency f3 in the LC resonator in the auxiliary resonance section 3 are different from each other (f1 is not equal to f3).

More specifically, for example, as illustrated in FIG. 6(A), the resonant frequency f3 is higher than the resonant frequency f1 (which is nearly equal to f2) (f3>f1). Alternatively, for example, as illustrated in FIG. 6(B), the resonant frequency f3 is lower than the resonant frequency f1 (which is nearly equal to f2) (f3<f1).

At this time, as will be described in detail later, for example, the resonant frequency f3 is preferably 1.1 times to 5.0 times both inclusive as high as the resonant frequency f1 (which is nearly equal to f2) (1.1=/<(f3/f1)=/<5.0), and more preferably 1.25 times to 3.00 times both inclusive as high as the resonant frequency f1 (1.25=/<(f3/f1)=/<3.00). It is because flattening (uniformization) of the transmission efficiency distribution corresponding to the relative position which will be described later (here, the positions of the electronic apparatuses 2A and 2B with respect to the electric power feed apparatus 1) is easily achievable accordingly.

(Functions and Effects of Electric Power Feed System 4)

(1. Summary of Entire Operation)

In this electric power feed system 4, in the electric power feed apparatus 1, the high-frequency electric power generation circuit 111 supplies, to the electric power transmission coil L1 and the resonant capacitor C1 (the LC resonator) in the electric power transmission section 110, predetermined high-frequency electric power (an AC signal) for performing electric power transmission. Thus, a magnetic field (a magnetic flux) is generated in the electric power transmission coil L1 in the electric power transmission section 110. At this time, when the electronic apparatuses 2A and 2B as electric power feed targets (charge targets) are placed on (or close to) a top surface (the electric power feed surface S1) of the electric power feed apparatus 1, the electric power transmission coil L1 in the electric power feed apparatus 1 and the electric power reception coils L2 in the electronic apparatuses 2A and 2B are brought close to each other around the electric power feed surface S1.

When the electric power reception coils L2 are brought close to the electric power transmission coil L1 generating the magnetic field (the magnetic flux) in such a manner, an electromotive force is induced in the electric power reception coils L2 by the magnetic flux generated by the electric power transmission coil L1. In other words, the magnetic flux is linked with each of the electric power transmission coil L1 and the electric power reception coils L2 by electromagnetic induction or magnetic resonance to generate a magnetic field. Thus, electric power transmission is performed from the electric power transmission coil L1 (a primary side, the electric power feed apparatus 1, the electric power transmission section 110) to each of the electric power reception coils L2 (a secondary side, each of the electronic apparatuses 2A and 2B, the electric power reception section 210) (refer to electric power P1 illustrated in FIG. 2). At this time, in the electric power feed apparatus 1, the main resonance operation (the resonant frequency f1) with use of the electric power transmission coil L1 and the resonant capacitor C1 is performed, and in the electronic apparatuses 2A and 2B, the main resonance operation (the resonant frequency f2 which is nearly equal to f1) with use of the electric power reception coil L2 and the resonant capacitor C2 is performed.

Then, in each of the electronic apparatuses 2A and 2B, AC electric power received in the electric power reception coil L2 is supplied to the rectifier circuit 213 and the voltage stabilization circuit 214 to perform the following charge operation. In other words, the rectifier circuit 213 converts the AC electric power into predetermined DC electric power, and then the voltage stabilization circuit 214 performs a voltage stabilization operation based on this DC electric power to charge the battery 215 or the battery (not illustrated) in the load 22. Thus, in each of the electronic apparatuses 2A and 2B, a charge operation based on electric power received by the electric power reception section 210 is performed.

In other words, in this embodiment, for example, a terminal connection to an AC adapter or the like may not be necessary to charge the electronic apparatuses 2A and 2B, and charge is allowed to easily start (noncontact electric power feeding is allowed to be performed) only through placing the electronic apparatuses 2A and 2B on (close to)

the electric power feed surface S1 of the electric power feed apparatus 1. This reduces a burden on a user.

(2. Functions of Auxiliary Resonance Section 3)

Next, functions of the auxiliary resonance section 3 which is one of characteristic parts in this embodiment will be described in detail below, in comparison with comparative examples (Comparative Examples 1 and 2).

Comparative Example 1

FIG. 7 illustrates a schematic configuration (refer to FIG. 7(A)) and electric power transmission characteristics (refer to FIG. 7(B)) of an electric power feed system (an electric power feed system 104) according to Comparative Example 1. The electric power feed system 104 according to Comparative Example 1 is a system performing noncontact electric power transmission through a magnetic field (refer to electric power P101 in FIG. 7(A)), as with the electric power feed system 4. The electric power feed system 104 includes an electric power feed apparatus (not illustrated) including an electric power transmission device 101 and an electronic apparatus (not illustrated) including the electric power reception device 21.

As illustrated in FIG. 7(A), even though the electric power transmission device 101 includes the electric power transmission coil L1, unlike the electric power transmission device 11, the electric power transmission device 101 does not include the auxiliary resonance section 3. Therefore, in Comparative Example 1, the following issue occurs. Namely, for example, as illustrated in FIG. 7(B), a magnetic force line distribution (a magnetic flux density distribution) in an internal region of the electric power transmission coil L1 is nonuniform, and electric power feeding efficiency (transmission efficiency) during electric power transmission (noncontact electric power feeding) becomes nonuniform depending on a relative position between the primary-side apparatus and the secondary-side apparatus (here, the position of the secondary-side apparatus). This is caused by the following reason. Namely, in a typical coil formed through winding a conductive wire or the like, a magnetic force line (magnetic flux) distribution is denser with decreasing distance to a coil end, thereby allowing a magnetic field to be stronger. On the other hand, the magnetic force line distribution is sparser with increasing distance from the coil end, thereby allowing the magnetic field to be weaker. Therefore, in a spiral coil or the like formed through flatly winding a wire, in a case where an internal diameter of the coil is sufficiently large, the magnetic field is strongest around a conductor located at an inner end of the coil, and the magnetic field is relatively weak around a central portion of the coil (refer to the magnetic flux density distribution in FIG. 7(B)). In Comparative Example 1, the magnetic flux density distribution by the electric power transmission coil L1 is nonuniform in such a manner.

Therefore, in Comparative Example 1, the transmission efficiency during electric power transmission is nonuniform depending on the relative position between the primary-side apparatus and the secondary-side apparatus (here, the position of the secondary-side apparatus). This causes a reduction in flexibility in the relative position (here, flexibility in the position of the secondary-side apparatus on an electric power feed surface of the primary-side apparatus) during electric power transmission, thereby impairing convenience for the user. It is to be noted that a relationship between such a relative position between the primary-side apparatus (the electric power feed apparatus, the electric power transmission side) and the secondary-side apparatus (the electronic apparatus, the electric power reception side), and transmission efficiency during electric power transmission is defined as "position characteristics", and will be described below.

Comparative Example 2

On the other hand, in an electric power feed system according to Comparative Example 2, electric power transmission (noncontact electric power feeding) is performed with use of an electric power transmission section 201A with, for example, a plane configuration (an X-Y plane configuration) illustrated in FIG. 8(A). The electric power transmission section 201A includes an electric power transmission coil L201 configured of two coils (split coils), i.e., an outer coil L201A and an inner coil L201B. In other words, in the electric power transmission coil L201, the outer coil L201A and the inner coil L201B are disposed with a predetermined distance (a difference in internal diameter) therebetween. However, in the electric power transmission coil L201, unlike the electric power transmission coil L1 and the auxiliary coil L3 (which are physically and electrically insulated from each other) in the above-described embodiment, the outer coil L201A and the inner coil L201B are physically and electrically connected to each other (not insulated from each other).

With use of the electric power transmission coil L201 configured of such split coils, in the electric power transmission section 201A, for example, as illustrated in a magnetic flux density distribution in FIG. 8(B), compared to a case where the split coils are not used (for example, in a case where the inner coil L201B is not provided), the magnetic flux density distribution is uniformized to some extent (refer to a double arrow in the drawing). It is because, as illustrated by a solid arrow and a dashed arrow in FIG. 8(B), in an internal region of the inner coil L201B, a direction of a magnetic flux generated by the outer coil L201A and a direction of a magnetic flux generated by the inner coil L201B are set to be the same as each other (here, in a positive direction on a Z axis).

However, such setting of the directions of the magnetic fluxes causes an issue in the electric power feed system according to Comparative Example 2 that a region (a dead band) where transmission efficiency is considerably reduced depending on the relative position (here, the position of the secondary-side apparatus (the electric power reception coil)) during electric power transmission may be present. More specifically, this issue is caused by the following reason. Namely, first, in a case where the electric power reception coil is disposed in the internal region of the inner coil L201B, as described above, in this region, the direction of the magnetic flux by the outer coil L201A and the direction of the magnetic flux by the inner coil L201B are the same as each other (in the positive direction on the Z axis). Therefore, a large amount of the magnetic flux passes through the electric power reception coil by the presence of the inner coil L201B. Thus, as described above, a reduction in magnetic flux density in the internal region of the inner coil L201B (around a central portion of the coil) is alleviated to some extent.

On the other hand, in a case where the electric power reception coil is disposed in a gap region between the outer coil L201A and the inner coil L201B, the direction of the magnetic flux by the outer coil L201A and the direction of the magnetic flux by the inner coil L201B are not the same as each other, and are partially opposite to each other. To describe this with an extreme example, as indicated by the solid arrow and the dashed arrow in FIG. 8(B), the direction of the magnetic flux by the outer coil L201A and the direction of the magnetic flux by the inner coil L201B are entirely opposite to each other. In this case, the magnetic fluxes (the magnetic force lines) equivalently cancel out in part; therefore, an increase in magnetic flux density around an inner end of the outer coil L201A is suppressed to some extent. However, the direction of a magnetic flux equivalently passing through the electric power reception coil is determined by balance between the magnetic flux density of magnetic force lines generated by the outer coil 1201A and the magnetic flux density of magnetic force lines generated by the inner coil L201B around the electric power reception coil. Then, as described above, in a case where the electric power reception coil is disposed at a position where these directions of the magnetic fluxes (magnetic flux densities) are perfectly equal to each other, the magnetic fluxes equivalently cancel out, and the magnetic fluxes does not pass through the electric power reception coil; therefore, transmission efficiency is extremely reduced, and noncontact electric power feeding is almost impossible.

As described above, in the electric power feed system according to Comparative Example 2, the region (the dead band) where transmission efficiency is considerably reduced depending on the relative position (the position of the secondary-side apparatus) during electric power transmission may be present. It is to be noted that, in a case where the split coils in Comparative Example 2 are used as the electric power transmission coils, the same high-frequency electric power is applied to the outer coil and the inner coil; therefore, such an issue of dead band generation is inevitable.

Embodiment

On the other hand, in this embodiment, for example, the above-described issue in Comparative Example 2 is solved through including, in the electric power transmission section 110, the auxiliary resonance section 3 provided with the auxiliary coil L3 (which is physically and electrically insulated from the electric power transmission coil L1) with, for example, a configuration illustrated in FIGS. 3 to 5.

More specifically, in this embodiment, as illustrated in FIGS. 6(A) and 6(B), the resonant frequency f1 (which is nearly equal to f2) in the main resonance operation during electric power transmission through a magnetic field and the resonant frequency f3 in the LC resonator in the auxiliary resonance section 3 are different from each other (f1 is not equal to f3). Therefore, a relationship (position characteristics) between the relative position between the electric power feed apparatus 1 and the electronic apparatuses 2A and 2B (here, the positions of the electronic apparatuses 2A and 2B) and transmission efficiency during electric power transmission is varied by adjustment of such a difference between the resonant frequencies f1 and f3. In other words, the main resonance operation (a position distribution of transmission efficiency) during electric power transmission is controlled with use of the auxiliary resonance operation in the auxiliary resonance section 3.

At this time, for example, as illustrated in FIG. 6(A), in a case where the resonant frequency f3 is set to be higher than the resonant frequency f1 (f3>f1), variation in transmission efficiency with variation in the above-described relative position (nonuniformity of transmission efficiency depending on the relative position) is reduced. In other words, compared to a case where the resonant frequencies f1 and f3 are equal to each other (corresponding to the case of the above-described Comparative Example 2), flattening (uniformization) of the transmission efficiency distribution depending on the relative position is achieved. More specifically, this is because a coupling coefficient (a magnetic coupling coefficient) as one of main parameters determining transmission efficiency is less likely to be varied, even if the relative position is shifted (the coupling coefficient hardly depends on the relative position). Moreover, from another perspective, even if the dead band (a region where transmission efficiency is extremely low) depending on the relative position is present in the resonant frequency f3 in the auxiliary resonance operation, the resonant frequency f1 in the main resonance operation is different from the resonance frequency f3 (f1 is not equal to f3); therefore, the dead band does not affect electric power transmission.

On the other hand, for example, as illustrated in FIG. 6(B), in a case where the resonant frequency f3 is set to be lower than the resonant frequency f1 (f3<f1), the distribution of transmission efficiency with respect to variation in the above-described relative position is allowed to be arbitrarily controlled. More specifically, for example, it is achievable to selectively provide a region where transmission efficiency is relatively high and a region where transmission efficiency is relatively low (to perform electric power transmission in a selective region on the electric power feed surface S1).

Example of First Embodiment

Here, FIGS. 9 to 11 illustrate various kinds of data of an example of this embodiment. In this example, the electric power transmission section 110 with a configuration illustrated in FIGS. 4(A) and 4(B) was used. More specifically, the internal diameter phi1 of the electric power transmission coil L1 was 120 mm, the internal diameter phi3 of the auxiliary coil L3 was 60 mm, the number n3 of turns of the auxiliary coil L3 was 5, and the resonant frequency f3 was 2*f1. Then, the electric power reception coil L2 with an external diameter phi of 10 mm was disposed with a distance of 6 mm from a top surface of the electric power transmission coil L1 in a vertical direction (the Z-axis direction). It is to be noted that, in the electronic apparatuses 2A and 2B, the resonant frequency f2 was set to be nearly equal to f1.

First, FIG. 9(A) illustrates an example of variation in transmission characteristics by the position of the electric power reception coil L2. More specifically, the transmission characteristics in a case where the electric power reception coil L2 was shifted in a horizontal direction (in an X-Y plane) with respect to the above-described position as a reference (a shift length d) were measured. The position at a shift length d of 0 mm corresponds to a point on an axis perpendicular to the central points CP1 and CP3 of the electric power transmission coil L1 and the auxiliary coil L3. As used herein, $S_{21}$ (an S parameter) on a vertical axis refers to a parameter relating to electric power feeding efficiency (transmission efficiency). It was found out from FIG. 9(A) that, even if the position of the electric power reception coil L2 was shifted (by the shift length d), $S_{21}$ (transmission efficiency) was hardly varied at a frequency (1*f1) around the resonant frequency f1 during electric power transmission (refer to a reference numeral G11 in the drawing). On the other hand, it was found out that $S_{21}$ (transmission efficiency) was greatly varied at a frequency (2*f1) around the resonance frequency f2 in the auxiliary resonance section 3 (refer to a reference numeral G12 in the drawing), and a position (corresponding to a dead band) where $S_{21}$ (transmission efficiency) was extremely reduced was present.

Moreover, FIG. 9(B) illustrates an example of variation in phase characteristics by the position of the electric power reception coil L2. It was found out from FIG. 9(B) that, while a phase was hardly varied at a frequency (1*f1) around the resonant frequency f1 during electric power transmission (refer to a reference numeral G21 in the drawing), the phase was greatly varied (the phase was reversed) at a frequency (2*f1) around the resonant frequency f2 in the auxiliary resonance section 3 (refer to a reference numeral G22 in the drawing).

It was found out from these results in FIGS. 9(A) and 9(B) that, in a case where the split coils described in the above-described Comparative Example 2 were used, phase reversal and an extreme reduction in transmission efficiency occurred at the frequency (1*f1) around the resonant frequency f1 during electric power transmission by the position of the electric power reception coil L2. In other words, if the resonant frequencies f1 and f3 are equal to each other (f1=f3), a dead band during electric power transmission may be generated.

Next, FIG. 10(A) illustrates an example of variation in position characteristics (here, characteristics exhibiting a relationship between the shift length d of the electric power reception coil L2 and transmission efficiency) depending on presence or absence of the auxiliary resonance section 3. It was found out from FIG. 10(A) that, when the auxiliary resonance section 3 was provided, transmission efficiency in the gap region between the electric power transmission coil L1 and the auxiliary coil L3 was improved (refer to an arrow in the drawing), and a substantially uniform transmission efficiency distribution was obtained.

Moreover, FIGS. 10(B) and 10(C) illustrate an example of variation in position characteristics in a case where the resonant frequency f3 in the auxiliary resonance operation was varied ((in a case the resonant frequency f3 was varied within a range of f3/f1=0.05 to 3.00). It was found out from these drawings that, in terms of uniformization of the transmission efficiency distribution, it was only necessary for the resonant frequency f3 to be larger than the resonant frequency f1 (f3>f1), and the resonant frequency f3 was preferably 1.1 times to 5.0 times both inclusive as high as the resonant frequency f1, and more preferably 1.25 times to 3.0 times both inclusive as high as the resonant frequency f1. Moreover, it was found out that, in this example, in a case where the resonant frequency f3 was equal to 2*f1, uniformization of the transmission efficiency distribution was most achieved (refer to a solid arrow in FIG. 10(B)). On the other hand, in a case where the resonant frequency f3 was lower than the resonant frequency f1 (f3<f1), for example, as illustrated by a dashed arrow in FIG. 10(B), the transmission efficiency distribution with respect to the position of the electric power reception coil L2 (the shift length d) was arbitrarily controllable. For example, in the case of f3=0.50*f1, while the transmission efficiency is relatively low in the internal region of the auxiliary coil L3, transmission efficiency in the gap region between the auxiliary coil L3 and the electric power transmission coil L1 is relatively high. Therefore, it is achievable to perform electric power transmission in a selective region (here, the gap region between the auxiliary coil L3 and the electric power transmission coil L1) on the electric power feed surface S1. It is to be noted that the degree of variation in position characteristics when such a resonant frequency f3 is varied depends on configurations and positions of the electric power transmission coil L1 and the auxiliary coil L3, an influence by a peripheral metal or a peripheral magnetic material in an enclosure of the electric power feed apparatus 1, an influence received from a metal or a magnetic material used for enclosures of the electronic apparatuses 2A and 2B, and the like. Therefore, it is only necessary to determine an optimum value of the resonant frequency f3 in consideration of these influences. In other words, it is only necessary to determine the resonant frequency f3 at a frequency not allowing phase reversal and an extreme reduction in transmission efficiency as described in FIGS. 9(A) and 9(B) to occur around the resonant frequency f1 during electric power transmission.

Next, FIG. 11(A) illustrates an example of variation in position characteristics in a case where the internal diameter phi3 of the auxiliary coil L3 is varied and FIG. 11(B) illustrates an example of variation in position characteristics in a case where the number n3 of turns of the auxiliary coil L3 is varied. It was found out from FIGS. 11(A) and 11(B) that, when the internal diameter phi3 of the auxiliary coil L3, the number n3 of turns of the auxiliary coil L3, or the like was varied, the position characteristics were allowed to be slightly varied. More specifically, it was found out from FIG. 11(A) that transmission efficiency was slightly improved with an increase in the internal diameter phi3 of the auxiliary coil L3. Moreover, it was found out from FIG. 11(B) that transmission efficiency was slightly improved with an increase in the number n3 of turns of the auxiliary coil L3. Therefore, it was found out that the shape and the position of the auxiliary coil L3, the resonant frequency f3, and the like were parameters when the position characteristics were varied (the transmission efficiency distribution was uniformized), and the resonant frequency f3 was particularly an important parameter.

As described above, in this embodiment, since the resonant frequency f1 in the main resonance operation during electric power transmission through a magnetic field and the resonant frequency f3 in the LC resonator in the auxiliary resonance section 3 are different from each other, a relationship (position characteristics) between the relative position between the electric power transmission side (the electric power feed apparatus 1) and the electric power reception side (the electronic apparatuses 2A and 2B) and transmission efficiency during electric power transmission is allowed to be varied through adjusting a difference between these resonant frequencies f1 and f3. Therefore, when electric power transmission (noncontact electric power feeding) is performed between apparatuses through a magnetic field, transmission efficiency control corresponding to positions of the apparatuses is allowed to be performed.

In particular, in a case where the resonant frequency f3 is set to be higher than the resonant frequency f1 (f3>f1), variation in transmission efficiency with respect to variation in the above-described relative position (nonuniformity in transmission efficiency depending on the relative position) is allowed to be reduced. In other words, compared to a case where the resonant frequencies f1 and f3 are equal to each other (corresponding to the case in the above-described Comparative Example 2), flattening (uniformization) of the transmission efficiency distribution corresponding to the relative position is achievable. Therefore, a noncontact electric power feed system which does not have a dead band in a wide region on the electric power feed surface S1 and is capable of obtaining substantially uniform transmission efficiency is allowed to be configured. Moreover, effects including an improvement in electric power feeding stability during noncontact electric power feeding, an improvement in flexibility in the position of the secondary-side apparatus (the electronic apparatuses 2A and 2B), an improvement in performance of detection of different kinds of metals, and the like are obtainable accordingly.

Further, in a case where the internal diameter phi3 of the auxiliary coil L3 is set to be smaller than the internal diameter phi1 of the electric power transmission coil L1 (phi3<phi1), the following effects are obtainable. Namely, a magnetic field around a central portion, where a magnetic field is relatively weak without the auxiliary coil L3, of the electric power transmission coil L1 is allowed to be reinforced, and the transmission efficiency distribution corresponding to the relative position is allowed to be further uniformized.

Next, other embodiments (second to fifth embodiments) of the present disclosure will be described below. It is to be noted that like components are denoted by like numerals as of the above-described first embodiment and will not be further described.

Second Embodiment (Configuration of Electric Power Feed System 4A)

FIG. 12 illustrates a schematic configuration example of an electric power feed system (an electric power feed system 4A) according to the second embodiment. The electric power feed system 4A according to this embodiment is a system performing noncontact electric power transmission through a magnetic field, as with the electric power feed system 4, and includes an electric power feed apparatus (not illustrated) including an electric power transmission device 11A and one or a plurality of electronic apparatuses (not illustrated) each including the electric power reception device 21. In other words, the electric power feed system 4A is different from the electric power feed system 4 in that the electric power transmission device 11A is provided instead of the electric power transmission device 11, and other configurations in the electric power feed system 4A are similar to those in the electric power feed system 4.

The electric power transmission device 11A includes an electric power transmission section 110A including the electric power transmission coil L1 and an auxiliary resonance section 3A. The auxiliary resonance section 3A is different from the auxiliary resonance section 3 in that the auxiliary resonance section 3A includes a plurality of (here, two) LC resonators configured of a plurality of (here, two) auxiliary coils L31 and L32 and a plurality of (here, two) resonant capacitors C31 and C32 (capacitor elements). More specifically, one LC resonator is configured of the auxiliary coil L31 and the resonant capacitor C31, and one LC resonator is configured of the auxiliary coil L32 and the resonant capacitor C32. Hereinafter, a resonant frequency (an auxiliary resonant frequency) in an auxiliary resonance operation in the LC resonator configured of the auxiliary coil L31 and the resonant capacitor C31 is represented by "f31". Moreover, a resonant frequency (an auxiliary resonant frequency) in an auxiliary resonance operation in the LC resonator configured of the auxiliary coil L32 and the resonant capacitor C32 is represented by "f32". It is to be noted that, in a case where a predetermined parasitic capacitance component is used instead of the resonant capacitors C31 and C32, or the like, the resonant capacitors C31 and 32 in the auxiliary resonance section 3A may not be also provided.

(Specific Configuration of Electric Power Transmission Section 110A)

FIG. 13 illustrates a specific configuration example (an X-Y plane configuration example) of the electric power transmission section 110A. In the electric power transmission section 110A, the above-described electric power transmission coil L1 and the two auxiliary coils L31 and L32 are disposed on the shield plate 110S so as to be insulated (physically and electrically insulated) from each other. However, the two auxiliary coils L31 and L32 may not be insulated from each other (may be physically and electrically connected to each other) in some cases.

In the electric power transmission section 110A, the electric power transmission coil L1 and each of the auxiliary coils L31 and L32 are disposed on a substantially same plane (here, a surface (a same plane) of the shied plate 110S). However, positions of the electric power transmission coil L1 and the auxiliary coils L31 and L32 are not limited thereto, and, for example, the auxiliary coils L31 and L32 may be disposed on a plane shifted along a direction (the Z-axis direction) perpendicular to the coil surface of the electric power transmission coil L1. In other words, the electric power transmission coil L1 and the auxiliary coils L31 and L32 may be disposed on different planes. When the electric power transmission coil L1 and the auxiliary coils L31 and L32 are disposed in such a manner, flexibility in design (position) of the auxiliary resonance section 3A is improved. On the other hand, as illustrated in FIG. 13, in a case where the electric power transmission coil L1 and the auxiliary coils L31 and L32 are disposed on a substantially same plane, a reduction in the thickness of the electric power transmission section 110A is achieved. The following description will be given with use of an example in which these coils are disposed on a same plane.

Moreover, as illustrated in FIG. 13, the central point CP1 of the electric power transmission coil L1, a central point CP31 of the auxiliary coil L31, and a central point CP32 of the auxiliary coil L32 are located along a substantially same axis (the Z axis; here, at a substantially same point). Thus, a configuration of the electric power transmission section 110A configured through including the electric power transmission coil L1 and the auxiliary coils L31 and L32 is substantially symmetric in the X-axis direction and the Y-axis direction; therefore, flattening (uniformization) of a transmission efficiency distribution corresponding to the above-described relative position is easily achieved. Then, each of internal diameters phi31 (phi31x, phi31y) and phi32 (phi32x, phi32y) of the auxiliary coils L31 and L32 is smaller than the internal diameter phi1 (phi1x, phi1y) of the electric power transmission coil L1 ((phi31x, phi32x) <phi1x, (phi31y, phi32y)<phi1y). Moreover, at the same time, the internal diameters phi31 (phi31x, phi31y) and phi32 (phi32x, phi32y) of the auxiliary coils L31 and L32 are different from each other (phi31x is not equal to phi32x, phi31y is not equal to phi32y). Therefore, a magnetic field around a central portion, where a magnetic field is relatively weak without the auxiliary coils L31 and L32, of the electric power transmission coil L1 is allowed to be gradually reinforced, and the uniformization of the transmission efficiency distribution corresponding to the above-described relative position is easily achievable. Thus, the electric power transmission coil L1, the auxiliary coil L31, and the auxiliary coil L32 are formed in concentric circles with internal diameters different from one another.

Moreover, a difference value (a difference in internal diameter, a gap) between the internal diameters of the electric power transmission coil L1 and an outermost auxiliary coil (the auxiliary coil L31) and a difference value between the internal diameters of the auxiliary coils L31 and L32 adjacent to each other are gradually increased from the electric power transmission coil L1 side (an outer side) toward the central point CP1 or the like (an inner side). More specifically, g2x>g1x and g2y>g1y are established, where (phi1x−phi31x) is equal to an internal diameter difference g1x, (phi1y−phi31y) is equal to an internal diameter difference g1y, (phi31x−phi32x) is equal to an internal diameter difference g2x, and (phi31y−phi32y) is equal to an internal diameter difference g2y.

In addition, for example, as illustrated in FIG. 13, in a case where each of the electric power transmission coil L1 and the auxiliary coils L31 and L32 has an inner surface shape exhibiting anisotropy (for example, an oval shape, a rectangular shape, an elliptical shape, or the like), the above-described internal diameter differences preferably also satisfy the following conditions. More specifically, it is preferable that each of the difference value between the internal diameters of the electric power transmission coil L1 and the outermost auxiliary coil L31 and the difference value between the internal diameters of the auxiliary coils L31 and L32 adjacent to each other be larger in a major-axis direction (here, the Y-axis direction) in the above-described inner surface shape exhibiting anisotropy than in a minor-axis direction (here, the X-axis direction). In other words, g1y>g1x and g2y>g2x are preferably established. Thus, uniformization of the transmission efficiency distribution corresponding to the above-described relative position is achievable more effectively.

It is to be noted that the configurations of the electric power transmission coil L1 and the auxiliary coils L31 and L32 in the electric power transmission section 110A are not limited to those illustrated in FIG. 13, as with the case of the electric power transmission section 110 described in the first embodiment, and the electric power transmission coil L1 and the auxiliary coils L31 and L32 may have other configurations. In other words, for example, each of the electric power transmission coil L1 and the auxiliary coils L31 and L32 may have an inner surface shape exhibiting isotropy (a circular shape or the like). Moreover, in the internal diameter differences, at least a part of the above-described relationship may not be established.

(Relationship Between Resonant Frequencies f1, f31, and f32)

In this embodiment, as with the first embodiment, the resonant frequency f1 (which is nearly equal to f2) in the main resonance operation during electric power transmission through a magnetic field and the resonant frequencies f31 and f32 in the LC resonators in the auxiliary resonance section 3A are different from each other (f1 is not equal to (f31, f32)). More specifically, for example, as illustrated in FIG. 14(A), each of the resonant frequencies f31 and f32 is higher than the resonant frequency f1 (which is nearly equal to f2) ((f31, f32)>f1). Alternatively, as illustrated in FIG. 14(B), each of the resonant frequencies f31 and f32 is lower than the resonant frequency f1 (which is nearly equal to f2) ((f31, f32)<f1).

Moreover, in these cases, the resonant frequencies f31 and f32 in a plurality of (here, two) LC resonators may be equal to each other (f31=f32), or may be different from each other (f31 is not equal to f31: f31<f32 or f31>f32).

(Functions and Effects of Electric Power Feed System 4A)

In the electric power feed system 4A according to this embodiment, since the resonant frequency f1 in the main resonance operation during electric power transmission through a magnetic field and the resonance frequencies f31 and f32 in the LC resonators in the auxiliary resonance section 3A are different from each other, effects similar to those in the first embodiment are obtainable by functions similar to those in the first embodiment. In other words, when electric power transmission (noncontact electric power feeding) is performed between apparatuses through a magnetic field, transmission efficiency control corresponding to the positions of the apparatuses is allowed to be performed. Moreover, in a case where the resonant frequencies f31 and f32 are set to be higher than the resonant frequency f1 ((f31, f32)>f1), variation in transmission efficiency with respect to variation in the relative position (nonuniformity in transmission efficiency depending on the relative position) is allowed to be reduced.

In particular, in this embodiment, since the auxiliary resonance section 3A includes a plurality of LC resonators configured of a plurality of auxiliary coils L31 and L32 and a plurality of resonant capacitors C31 and C32, advantages of the above-described effects are large in a case where the internal region of the electric power transmission coil L1 is specifically wide.

Example of Second Embodiment

Here, FIG. 15 illustrates data of an example of this embodiment (an example of variation in position characteristics depending on presence or absence of the auxiliary resonance section 3A). In this example, the electric power transmission section 110A with a configuration illustrated in FIG. 13 was used, and the internal diameter phi1y in the major-axis direction and the internal diameter phi1x in the minor-axis direction of the electric power transmission coil L1 was 188 mm and 119 mm, respectively. Moreover, in the auxiliary coil L31, the internal diameter phi31y in the major-axis direction and the internal diameter phi31x in the minor-axis direction were 141 mm and 92 mm, respectively, and in the auxiliary coil L32, the internal diameter phi32y in the major-axis direction and the internal diameter phi32x in the minor-axis direction were 75 mm and 46 mm, respectively.

It was found out from FIG. 15 that, when the auxiliary resonance section 3A was provided, transmission efficiency in the gap region between the electric power transmission coil L1 and the auxiliary coils L31 and L32 was improved (refer to an arrow in the drawing), and a substantially uniform transmission efficiency distribution was obtained. Moreover, in this example, since the internal region of the electric power transmission coil L1 was wider than that in the example of the first embodiment (the internal diameter was larger), it was found out that, compared to the result illustrated in FIG. 10(A), an effect of improving uniformization of the transmission efficiency distribution was large.

Third Embodiment (Configurations of Electric Power Feed Systems 4B and 4C)

FIGS. 16(A) and 16(B) illustrate schematic configuration examples of electric power feed systems (electric power feed systems 4B and 4C) according to the third embodiment. Each of the electric power feed systems 4B and 4C according to the third embodiment is a system performing noncontact electric power transmission through a magnetic field, as with the electric power feed system 4.

However, this embodiment is different from the first and second embodiments in that an electronic apparatus (the secondary-side apparatus) as an electric power feed target is larger in size than an electric power feed apparatus (the primary-side apparatus). In other words, the third embodiment corresponds to a case where an electric power reception surface in the electronic apparatus is larger than an electric power transmission surface (an electric power feed surface) in the electric power feed apparatus.

The electric power feed system 4B illustrated in FIG. 16(A) includes an electric power feed apparatus (not illustrated) including an electric power transmission device 11B and one or a plurality of electronic apparatuses (not illustrated) including an electric power reception device 21B. The electric power transmission device 11B includes an electric power transmission section 110B including the electric power transmission coil L1, and the electric power reception device 21B includes an electric power reception section 210B including the electric power reception coil L2 and the auxiliary resonance section 3. In other words, the electric power reception section 210B includes one LC resonator configured of one auxiliary coil L3 and one resonant capacitor C3.

On the other hand, the electric power feed system 4C illustrated in FIG. 16(B) includes an electric power feed apparatus (not illustrated) including the electric power transmission device 11B and one or a plurality of electronic apparatuses (not illustrated) including an electric power reception device 21C. The electric power reception device 21C includes an electric power reception section 210C including the electric power reception coil L2 and the auxiliary resonance section 3A. In other words, the electric power reception section 210C includes two LC resonators configured of two auxiliary coils L31 and L32 and two resonant capacitors C31 and C32.

The configurations of the auxiliary resonance sections 3 and 3A in this embodiment are basically similar to those described in the first and second embodiments. Moreover, the resonance frequency f2 (which is nearly equal to f1) in a main resonance operation in each of the electric power reception devices 21B and 21C and each of the resonance frequencies f3, f31, and f32 in the LC resonators in the auxiliary resonance sections 3 and 3A are different from each other (f2 is not equal to (ff3, f31, f32)). More specifically, for example, each of the resonant frequencies f3, f31, and f32 is higher than the resonant frequency f2 (which is nearly equal to f1) ((f3, f31, f32)>f2). Alternatively, for example, each of the resonant frequencies f3, f31, and f32 is lower than the resonant frequency f2 (which is nearly equal to f1) ((f3, f31, f32)<f2).

(Functions and Effects of Electric Power Feed Systems 4B and 4C)

In the electric power feed systems 4B and 4C according to this embodiment, since the auxiliary resonance sections 3 and 3A are provided, effects similar to those in the first and second embodiments are obtainable by functions similar to those in the first and second embodiments. In other words, when electric power transmission (noncontact electric power feeding) is performed between apparatuses through a magnetic field, transmission efficiency control corresponding to the positions of the apparatuses is allowed to be performed. Moreover, in a case where each of the resonant frequencies f3, f31, and f32 is set to be higher than the resonant frequency f2 (which is nearly equal to f1) ((f3, f31, f32)>f1), variation in transmission efficiency with respect to variation in the relative position (nonuniformity in transmission efficiency depending on the relative position) is allowed to be reduced.

In particular, in this embodiment, since the auxiliary resonance sections 3 and 3A are provided to the electric power reception devices 21B and 21C (the electronic apparatus side), respectively, nonuniformity in transmission efficiency depending on the position (relative position) of the electric power feed apparatus in the electric power reception surface of the electronic apparatus is allowed to be reduced.

In other words, for example, compared to an electric power feed system (an electric power feed system 304) according to Comparative Example 3 illustrated in FIG. 17 in which the auxiliary resonance sections 3 and 3A are not provided to an electric power reception device 302 including an electric power reception section 302A (the electronic apparatus side), nonuniformity in transmission efficiency depending on the position of the electric power feed apparatus in the electric power reception surface of the electronic apparatus is allowed to be reduced.

Fourth Embodiment (Configurations of Electric Power Feed Systems 4D, 4E, 4F, and 4G)

FIGS. 18(A), 18(B), 19(A), and 19(B) illustrate schematic configuration examples of electric power feed systems (electric power feed systems 4D, 4E, 4F, and 4G) according to the fourth embodiment. Each of the electric power feed systems 4D, 4E, 4F, and 4G according to this embodiment is a system performing noncontact electric power transmission through a magnetic field, as with the electric power feed system 4.

However, this embodiment is different from the first to third embodiments in that this embodiment corresponds to a case where an electric power feed apparatus (the primary-side apparatus) and an electronic apparatus (the secondary-side apparatus) have a relatively large electric power transmission surface (electric power feed surface) and a relatively large electric power reception surface, respectively.

The electric power feed system 4D illustrated in FIG. 18(A) includes an electric power feed apparatus (not illustrated) including the electric power transmission device 11 and one or a plurality of electronic apparatuses (not illustrated) including the electric power reception device 21B. The electric power transmission device 11 includes the electric power transmission section 110 including the electric power transmission coil L1 and the auxiliary resonance section 3, and the electric power reception device 21B includes the electric power reception section 210B including the electric power reception coil L2 and the auxiliary resonance section 3. In other words, both the electric power transmission device 11 and the electric power reception device 21B include the auxiliary resonance section 3 including one LC resonator configured of one auxiliary coil L3 and one resonant capacitor C3.

The electric power feed system 4E illustrated in FIG. 18(B) includes an electric power feed apparatus (not illustrated) including the electric power transmission device 11A and one or a plurality of electronic apparatuses (not illustrated) including an electric power reception device 21C. The electric power transmission device 11A includes the electric power transmission section 110A including the electric power transmission coil L1 and the auxiliary resonance section 3A, and the electric power reception device 21C includes an electric power reception section 210C including the electric power reception coil L2 and the auxiliary resonance section 3A. In other words, both the electric power transmission device 11A and the electric power reception device 21C include the auxiliary resonance section 3A including two LC resonators configured of two auxiliary coils L31 and L32 and two resonant capacitors C31 and C32.

The electric power feed system 4F illustrated in FIG. 19(A) includes an electric power feed apparatus (not illustrated) including the electric power transmission device 11A and one or a plurality of electronic apparatuses (not illustrated) including the electric power reception device 21B. The electric power transmission device 11A includes the electric power transmission section 110A including the electric power transmission coil L1 and the auxiliary resonance section 3A, and the electric power reception device 21B includes the electric power reception section 210B including the electric power reception coil L2 and the auxiliary resonance section 3. In other words, while the electric power transmission device 11A includes the auxiliary resonance section 3A including two LC resonators configured of two auxiliary coils L31 and L32 and two resonant capacitors C31 and C32, the electric power reception device 21B includes the auxiliary resonance section 3 including one LC resonator configured of one auxiliary coil L3 and one resonant capacitor C3.

The electric power feed system 4G illustrated in FIG. 19(B) includes an electric power feed apparatus (not illustrated) including the electric power transmission device 11 and one or a plurality of electronic apparatuses (not illustrated) including the electric power reception device 21C. The electric power transmission device 11 includes the electric power transmission section 110 including the electric power transmission coil L1 and the auxiliary resonance section 3, and the electric power reception device 21C includes the electric power reception section 210C including the electric power reception coil L2 and the auxiliary resonance section 3A. In other words, while the electric power transmission device 11 includes the auxiliary resonance section 3 including one LC resonator configured of one auxiliary coil L3 and one resonant capacitor C3, the electric power reception device 21C includes the auxiliary resonance section 3A including two LC resonator configured of two auxiliary coils L31 and L32 and two resonant capacitors C31 and C32.

The configurations of the auxiliary resonance sections 3 and 3A in this embodiment are basically similar to those described in the first to third embodiments.

(Functions and Effects of Electric Power Feed Systems 4D, 4E, 4F, and 4G)

In the electric power feed systems 4D, 4E, 4F, and 4G according to this embodiment, since the auxiliary resonance sections 3 and 3A are provided, effects similar to those in the first to third embodiments are obtainable by functions similar to those in the first to third embodiments. In other words, when electric power transmission (noncontact electric power feeding) is performed between apparatuses through a magnetic field, transmission efficiency control corresponding to the positions of the apparatuses is allowed to be performed. Moreover, in a case where each of the resonant frequencies f3, f31, and f32 is set to be higher than each of the resonant frequencies f1 and f2 ((f3, f31, f32)>(f1, f2)), variation in transmission efficiency with respect to variation in the relative position (nonuniformity in transmission efficiency depending on the relative position) is allowed to be reduced.

In particular, in this embodiment, since the auxiliary resonance sections 3 or 3A is provided to both the electric power transmission device (the electric power feed apparatus) and the electric power reception device (the electronic apparatus), nonuniformity in transmission efficiency depending on the position of the electronic apparatus in the electric power transmission surface (the electric power feed surface) of the electric power feed apparatus and the position (the relative position) of the electric power feed apparatus in the electric power reception surface of the electronic apparatus is allowed to be reduced.

Fifth Embodiment (Configurations of Electric Power Feed Systems 4H, 4I, 4J, and 4K)

FIGS. 20(A), 20(B), 21(A), and 21(B) illustrate schematic configuration examples of electric power feed systems (electric power feed systems 4H, 4I, 4J, and 4K) according to the fifth embodiment. Each of the electric power feed systems 4H, 4I, 4J, and 4K according to the fifth embodiment is a system performing noncontact electric power transmission through a magnetic field, as with the electric power feed system 4.

However, this embodiment is different from the first to fourth embodiments in that the auxiliary resonance section 3 or the auxiliary resonance section 3A is provided to another apparatus (an auxiliary apparatus 41 or an auxiliary apparatus 41A which will be described later) as a separate body from the electric power feed apparatus (the primary-side apparatus) and the electronic apparatus (the secondary-side apparatus). In other words, each of the electric power feed systems according to this embodiment includes an electric power feed apparatus, one or a plurality of electronic apparatuses, and an auxiliary apparatus including an auxiliary resonance section.

The electric power feed system 4H illustrated in FIG. 20(A) includes an electric power feed apparatus (not illustrated) including an electric power transmission device 11H, one or a plurality of electronic apparatuses (not illustrated) including the electric power reception device 21, and an auxiliary apparatus 41 including the auxiliary resonance section 3. Moreover, the electric power transmission device 11H includes the electric power transmission section 110H including the electric power transmission coil L1, and the electric power reception device 21 includes the electric power reception section 210 including the electric power reception coil L2. In other words, the auxiliary apparatus 41 as an separate body from the electric power feed apparatus (the electric power transmission device 11H) and the electronic apparatus (the electric power reception device 21) includes the auxiliary resonance section 3 including one LC resonator configured of one auxiliary coil L3 and one resonant capacitor C3. It is to be noted that the electric power transmission device 11H and the electric power transmission section 110H have configurations similar to those of the above-described electric power transmission device 101 and the above-described electric power transmission section 101A, respectively.

The electric power feed system 4I illustrated in FIG. 20(B) includes an electric power feed apparatus (not illustrated) including the electric power transmission device 11H, one or a plurality of electronic apparatuses (not illustrated) including the electric power reception device 21, and an auxiliary apparatus 41A including the auxiliary resonance section 3A. In other words, the auxiliary apparatus 41A as a separate body from the electric power feed apparatus (the electric power transmission device 11H) and the electronic apparatus (the electric power reception device 21) includes the auxiliary resonance section 3A including two LC resonators configured of two auxiliary coils L31 and L32 and two resonant capacitors C31 and C32.

The electric power feed system 4J illustrated in FIG. 21(A) includes an electric power feed apparatus (not illustrated) including the electric power transmission device 11B, one or a plurality of electronic apparatuses (not illustrated) including an electric power reception device 21J, and the auxiliary apparatus 41 including the auxiliary resonance section 3. Moreover, the electric power transmission device 11B includes the electric power transmission section 110B including the electric power transmission coil L1, and the electric power reception device 21J includes an electric power reception section 210J including the electric power reception coil L2. In other words, the auxiliary apparatus 41 as a separate body from the electric power feed apparatus (the electric power transmission device 11B) and the electronic apparatus (the electric power reception device 21J) includes the auxiliary resonance section 3 including one LC resonator configured of one auxiliary coil L3 and one resonant capacitor C3. It is to be noted that the electric power reception device 21J and the electric power reception section 210J have configurations similar to those of the above-described electric power reception device 302 and the above-described electric power reception section 302A, respectively.

The electric power feed system 4K illustrated in FIG. 21(B) includes an electric power feed apparatus (not illustrated) including the electric power transmission device 11B, one or a plurality of electronic apparatuses (not illustrated) including an electric power reception device 21J, and the auxiliary apparatus 41A including the auxiliary resonance section 3A. In other words, the auxiliary apparatus 41A as a separate body from the electric power feed apparatus (the electric power transmission device 11B) and the electronic apparatus (the electric power reception device 21J) includes the auxiliary resonance section 3A including two LC resonators configured of two auxiliary coils L31 and L32 and two resonant capacitors C31 and C32.

(Functions and Effects of Electric Power Feed Systems 4H, 4I, 4J, and 4K)

In the electric power feed systems 4H, 4I, 4J, and 4K according to this embodiment, since the auxiliary resonance sections 3 and 3A are provided, effects similar to those in the first to fourth embodiment are obtainable by functions similar to those in the first to fourth embodiments. In other words, when electric power transmission (noncontact electric power feeding) is performed between apparatuses through a magnetic field, transmission efficiency control corresponding to the positions of the apparatuses is allowed to be performed. Moreover, in a case where each of the resonant frequencies f3, f31, and f32 is set to be higher than each of the resonant frequencies f1 and f2 ((f3, f31, f32)>(f1, f2)), variation in transmission efficiency with respect to variation in the relative position (nonuniformity in transmission efficiency depending on the relative position) is allowed to be reduced.

In particular, in this embodiment, since the auxiliary resonance section 3 or the auxiliary resonance section 3A is included in another apparatus (the auxiliary apparatus 41 or 41A) as a separate body from the electric power feed apparatus and the electronic apparatus, the above-described effects are obtainable only through adding the auxiliary apparatus 41 or 41A to a related-art (existing) electric power feed system.

Modification Examples

Although the technology of the present disclosure is described referring to some embodiments, the technology is not limited thereto, and may be variously modified.

For example, in the above-described embodiments, the case where one or two LC resonators are included in the auxiliary resonance section is described; however, the technology of the present disclosure is not limited thereto, and three or more LC resonators may be included in the auxiliary resonance section. Moreover, in the above-described embodiments and the like, each of the coils (the electric power transmission coil, the electric power reception coil, and the auxiliary coil) has a spiral shape (a flat shape); however, each of the coils may have, for example, an alpha winding shape in which a spiral coil is disposed to be piled up in two layers, a spiral shape with more than two layers, a helical shape in which a coil is wound in a thickness direction, or the like. For example, when the electric power transmission coil has any of these shapes, uniformization of transmission efficiency in a substantially entire region of a top surface (an electric power feed surface) of the electric power transmission coil is achievable. Moreover, each of the coils (the electric power transmission coil, the electric power reception coil, and the auxiliary coil) may be a conductive pattern coil configured of a printed circuit board, a flexible printed circuit board, or the like, instead of a winding coil configured of a conductive wire. It is to be noted that instead of the auxiliary coil with a coil shape, a conductive loop with a loop shape may be used to configure an LC resonator.

Moreover, the technology of the present disclosure is not limited to a case where each of the resonant capacitors (specifically, the resonant capacitor in the auxiliary resonance section) uses a fixed capacitance value, and each of the resonant capacitors may have a configuration in which a capacitance value is variable (for example, a configuration in which switching between connection paths of a plurality of capacitor elements is performed by a switch or the like). With such a configuration, control (optimization) of the resonant frequency is allowed to be performed by adjustment of the capacitance value.

Further, the auxiliary resonance section described in the above-described embodiments and the like may be included in one or more of the electric power feed apparatus, the electronic apparatus, and another apparatus as a separate body from the electric power feed apparatus and the electronic apparatus.

In addition, in the above-described embodiments, respective components of the electric power feed apparatus, the electronic apparatus, and the like are described in detail; however, all of the components are not necessarily included, and any other component may be further included. For example, the electric power feed apparatus (the electric power transmission device) or the electronic apparatus (the electric power reception device) may be provided with a communication function, a certain control function, a display function, a function of authenticating the secondary-side apparatus, a function of determining whether or not the secondary-side apparatus is placed on the primary-side apparatus, a function of detecting contamination of a different kind of metal, and the like.

Moreover, in the above-described embodiments, a case where a plurality of (two) electronic apparatuses are included in the electric power feed system is described as an example; however, the technology of the present disclosure is not limited thereto, and only one electronic apparatus may be included in the electric power feed system.

Further, in the above-described embodiments, as an example of the electric power feed apparatus, a charging tray for small electronic apparatuses (CE devices) such as cellular phones is described; however, the electric power feed apparatus is not limited to such a home charging tray, and is applicable as a charger for various electronic apparatuses. In addition, the electric power feed apparatus is not necessarily a tray, and may be a stand for electronic apparatuses, such as a so-called cradle.

It is to be noted that the technology of the present disclosure may have the following configurations.

(1) An electric power feed apparatus including an electric power transmission section including an electric power transmission coil for performing electric power transmission through a magnetic field and an auxiliary resonance section including one or a plurality of resonators, in which a main resonant frequency in a main resonance operation with use of the electric power transmission coil during the electric power transmission and an auxiliary resonant frequency in the resonator are different from each other.

(2) The electric power feed apparatus according to (1), in which the auxiliary resonant frequency is higher than the main resonant frequency.

(3) The electric power feed apparatus according to (1), in which the auxiliary resonant frequency is lower than the main resonant frequency.

(4) The electric power feed apparatus according to any one of (1) to (3), in which the auxiliary resonance section includes one resonator including an auxiliary coil.

(5) The electric power feed apparatus according to (4), in which an internal diameter of the auxiliary coil is smaller than an internal diameter of the electric power transmission coil.

(6) The electric power feed apparatus according to (4) or (5), in which a central point of the electric power transmission coil and a central point of the auxiliary coil are located along a substantially same axis.

(7) The electric power feed apparatus according to any one of (4) to (6), in which the electric power transmission coil and the auxiliary coil are disposed on a substantially same plane.

(8) The electric power feed apparatus according to any one of (1) to (3), in which the auxiliary resonance section includes a plurality of resonators each including an auxiliary coil.

(9) The electric power feed apparatus according to (8), in which an internal diameter of each of the auxiliary coils in the plurality of resonators is smaller than an internal diameter of the electric power transmission coil, and the internal diameters of the auxiliary coils are different from one another.

(10) The electric power feed apparatus according to (9), in which a central point of the electric power transmission coil and a central point of each of the auxiliary coils are located along a substantially same axis.

(11) The electric power feed apparatus according to (10), in which a difference value between internal diameters of the electric power transmission coil and an outermost auxiliary coil and a difference value between internal diameters of adjacent auxiliary coils are gradually increased from the electric power transmission coil side toward the central point.

(12) The electric power feed apparatus according to (10) or (11), in which each of the electric power transmission coil and the auxiliary coils has an inner surface shape exhibiting anisotropy, and a difference value between internal diameters of the electric power transmission coil and an outermost auxiliary coil and a difference value between internal diameters of adjacent auxiliary coils are larger in a major-axis direction in the inner surface shape than in a minor-axis direction.

(13) The electric power feed apparatus according to any one of (8) to (12), in which the electric power transmission coil and each of the auxiliary coils in the plurality of resonators are disposed on a substantially same plane.

(14) The electric power feed apparatus according to any one of (8) to (13), in which auxiliary resonant frequencies in the plurality of resonators are different from one another.

(15) The electric power feed apparatus according to any one of (4) to (14), wherein the electric power transmission coil and the auxiliary coil are electrically insulated from each other.

(16) The electric power feed apparatus according to any one of (1) to (15), in which the main resonance operation is performed with use of the electric power transmission coil, and a predetermined capacitor element or a parasitic capacitance component.

(17) An electric power feed system including:
one or a plurality of electronic apparatuses; and
an electric power feed apparatus performing electric power transmission to the electronic apparatuses, in which the electric power feed apparatus includes an electric power transmission section including an electric power transmission coil for performing electric power transmission through a magnetic field, the electronic apparatuses each includes an electric power reception section including an electric power reception coil for receiving electric power transmitted from the electric power transmission section, and an auxiliary resonance section is included in one or more of the electric power feed apparatus, the electronic apparatus, and another apparatus as a separate body from the electric power feed apparatus and the electronic apparatus, the auxiliary resonance section including one or a plurality of resonators that each have an auxiliary resonant frequency different from a main resonant frequency in a main resonance operation with use of the electric power transmission coil or the electric power reception coil during the electric power transmission.

(18) The electric power feed system according to (17), in which the auxiliary resonance section is included in an auxiliary apparatus as the other apparatus.

(19) An electronic apparatus including an electric power reception section including an electric power reception coil for receiving electric power transmitted through a magnetic field and an auxiliary resonance section including one or a plurality of resonators, in which a main resonant frequency in a main resonance operation with use of the electric power reception coil during the electric power transmission and an auxiliary resonant frequency in the resonator are different from each other.

(20) The electronic apparatus according to (19), in which the main resonance operation is performed with use of the electric power reception coil, and a predetermined capacitor element or a parasitic capacitance component.

The present disclosure contains subject matter related to that disclosed in Japanese Priority Patent Application No. 2011-073074 filed in the Japan Patent Office on Mar. 29, 2011, the entire content of which is hereby incorporated by reference.

The invention claimed is:

1. An electric power feed apparatus, comprising:
an electric power transmission section including:
a main resonance section that comprises an electric power transmission coil and a first resonant capacitor, wherein the main resonance section is configured to transmit electric power to an electronic apparatus through a magnetic field; and
an auxiliary resonance section including at least one resonator, wherein the auxiliary resonance section is configured to:

control a resonance operation of the main resonance section at a time of the transmission of the electric power; and control, based on adjustment of a difference between a main resonant frequency of the main resonance section and an auxiliary resonant frequency of the at least one resonator, position characteristics that indicate a relationship between transmission efficiency of the electric power feed apparatus and a relative position between the electric power feed apparatus and the electronic apparatus, wherein the at least one resonator comprises an auxiliary coil and a second resonant capacitor, and the transmission efficiency is associated with the transmission of the electric power by the main resonance section.

2. The electric power feed apparatus according to claim 1, wherein an internal diameter of the auxiliary coil is smaller than an internal diameter of the electric power transmission coil.

3. The electric power feed apparatus according to claim 1, wherein a central point of the electric power transmission coil and a central point of the auxiliary coil are located along a same axis.

4. The electric power feed apparatus according to claim 1, wherein the electric power transmission coil and the auxiliary coil are on a same plane.

5. The electric power feed apparatus according to claim 1, wherein the auxiliary resonance section includes a plurality of resonators each including an auxiliary coil.

6. The electric power feed apparatus according to claim 5, wherein an internal diameter of each of the auxiliary coils in the plurality of resonators is smaller than an internal diameter of the electric power transmission coil, and the internal diameters of the auxiliary coils are different from one another.

7. The electric power feed apparatus according to claim 6, wherein a central point of the electric power transmission coil and a central point of each of the auxiliary coils are located along a substantially same axis.

8. The electric power feed apparatus according to claim 7, wherein a difference value between internal diameters of the electric power transmission coil and an outermost auxiliary coil and a difference value between internal diameters of adjacent auxiliary coils are gradually increased from the electric power transmission coil side toward the central point.

9. The electric power feed apparatus according to claim 7, wherein each of the electric power transmission coil and the auxiliary coils has an inner surface shape exhibiting anisotropy, and a difference value between internal diameters of the electric power transmission coil and an outermost auxiliary coil and a difference value between internal diameters of adjacent auxiliary coils are larger in a major-axis direction in the inner surface shape than in a minor-axis direction.

10. The electric power feed apparatus according to claim 5, wherein the electric power transmission coil and each of the auxiliary coils in the plurality of resonators are disposed on a substantially same plane.

11. The electric power feed apparatus according to claim 5, wherein auxiliary resonant frequencies in the plurality of resonators are different from one another.

12. The electric power feed apparatus according to claim 1, wherein the electric power transmission coil is electrically insulated from the auxiliary coil.

13. The electric power feed apparatus according to claim 1, further comprising one of a capacitor element or a parasitic capacitance component for the resonance operation.

14. The electric power feed apparatus according to claim 1, wherein the first resonant capacitor of the main resonance section has a variable capacitance value and the second resonant capacitor of the auxiliary resonance section has a fixed capacitance value.

15. The electric power feed apparatus according to claim 1, further comprising a switch configured to adjust a capacitance value of at least one of the first resonant capacitor or the second resonant capacitor based on a switching operation between connection paths of a plurality of capacitor elements of the electric power feed apparatus.

* * * * *